United States Patent
Rollinger et al.

(10) Patent No.: US 8,997,484 B2
(45) Date of Patent: Apr. 7, 2015

(54) BOOST RESERVOIR CONTROL

(75) Inventors: John Eric Rollinger, Sterling Heights, MI (US); Adam J. Richards, Canton, MI (US); Alex O'Connor Gibson, Ann Arbor, MI (US); David Bell, Plymouth, MI (US); Julia Helen Buckland, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 290 days.

(21) Appl. No.: 13/474,472

(22) Filed: May 17, 2012

(65) Prior Publication Data

US 2013/0305709 A1 Nov. 21, 2013

(51) Int. Cl.
| | |
|---|---|
| F02D 23/02 | (2006.01) |
| F02B 21/00 | (2006.01) |
| F02B 29/00 | (2006.01) |
| F02D 41/00 | (2006.01) |
| F02D 41/10 | (2006.01) |
| F02D 41/14 | (2006.01) |
| F02M 25/07 | (2006.01) |

(52) U.S. Cl.
CPC ............ *F02M 25/0743* (2013.01); *F02B 21/00* (2013.01); *F02B 29/00* (2013.01); *F02D 41/0007* (2013.01); *F02D 41/0055* (2013.01); *F02D 41/10* (2013.01); *F02D 41/1446* (2013.01); *F02D 41/1448* (2013.01); *F02M 25/0707* (2013.01); *F02M 25/0709* (2013.01); *F02M 25/0727* (2013.01); *F02M 25/0742* (2013.01); *F02M 25/0745* (2013.01); *F02M 25/0746* (2013.01); *Y02T 10/144* (2013.01); *Y02T 10/146* (2013.01); *Y02T 10/47* (2013.01)

(58) Field of Classification Search
CPC ..... F02B 33/44; F02D 41/0007; F02D 23/00; F02D 29/56; F01N 5/00; Y02T 10/144
USPC ...................................................... 60/602, 611
See application file for complete search history.

(56) References Cited

U.S. PATENT DOCUMENTS

| | | | |
|---|---|---|---|
| 4,689,960 A | | 9/1987 | Schröder et al. |
| 5,064,423 A | * | 11/1991 | Lorenz et al. ................... 60/611 |
| 5,461,860 A | | 10/1995 | Schegk |
| 5,819,693 A | | 10/1998 | Curtil |

(Continued)

FOREIGN PATENT DOCUMENTS

| | | | |
|---|---|---|---|
| EP | 0754843 | A2 | 1/1997 |
| EP | 1233162 | A1 * | 8/2002 |
| WO | 2011038240 | A1 | 3/2011 |

OTHER PUBLICATIONS

Rollinger, John Eric et al., "Boost Reservoir and Throttle Coordination," U.S. Appl. No. 13/474,513, filed May 17, 2012, 62 pages.

(Continued)

*Primary Examiner* — Kenneth Bomberg
*Assistant Examiner* — Shafiq Mian
(74) *Attorney, Agent, or Firm* — Julia Voutyras; Alleman Hall McCoy Russell & Tuttle LLP

(57) ABSTRACT

Methods and systems are provided for reducing turbo lag in a boosted engine. A boost reservoir coupled to the engine may be charged with compressed intake air and/or combusted exhaust gas. The pressurized charge may then be discharged during a tip-in to either the intake or the exhaust manifold.

20 Claims, 8 Drawing Sheets

(56) References Cited

U.S. PATENT DOCUMENTS

| | | | |
|---|---|---|---|
| 6,003,315 A * | 12/1999 | Bailey | 60/605.2 |
| 6,966,299 B2 * | 11/2005 | Miyamoto et al. | 123/406.45 |
| 7,314,043 B1 * | 1/2008 | Berger et al. | 123/585 |
| 7,322,194 B2 | 1/2008 | Sun et al. | |
| 2007/0113553 A1 * | 5/2007 | Piriou et al. | 60/605.2 |
| 2007/0246008 A1 * | 10/2007 | Gerum | 123/316 |
| 2010/0314186 A1 * | 12/2010 | Ma | 180/165 |
| 2011/0041496 A1 * | 2/2011 | Mayr | 60/611 |
| 2011/0083646 A1 * | 4/2011 | Siuchta et al. | 123/564 |
| 2011/0132335 A1 | 6/2011 | Pursifull et al. | |
| 2011/0276204 A1 * | 11/2011 | Shutty et al. | 701/22 |
| 2012/0216532 A1 * | 8/2012 | Schaffeld et al. | 60/611 |

OTHER PUBLICATIONS

Rollinger, John Eric et al., "Boost Air Management for Improved Engine Performance," U.S. Appl. No. 13/474,434, filed May 17, 2012, 62 pages.

Rollinger, John Eric et al., "Boost Reservoir EGR Control," U.S. Appl. No. 13/474,495, filed May 17, 2012, 62 pages.

Rollinger, John Eric et al., "Coordination of CAM Timing and Blow-Through Air Delivery," U.S. Appl. No. 13/474,540, filed May 17, 2012, 44 pages.

Rollinger, John Eric et al., "Stored Compressed Air Management for Improved Engine Performance," U.S. Appl. No. 13/474,509, filed May 17, 2012, 33 pages.

* cited by examiner

BOOST RESERVOIR CONTROL

TECHNICAL FIELD

This application relates to the field of motor-vehicle engineering, and more particularly, to air induction in motor vehicle engine systems.

BACKGROUND AND SUMMARY

A boosted engine may offer greater fuel efficiency and lower emissions than a naturally aspirated engine of similar power. During transient conditions, however, the power, fuel efficiency, and emissions-control performance of a boosted engine may suffer. Such transient conditions may include rapidly increasing or decreasing engine load, engine speed, or mass air flow. For example, when the engine load increases rapidly, a turbocharger compressor may require increased torque to deliver an increased air flow. Such torque may not be available, however, if the turbine that drives the compressor is not fully spun up. As a result, an undesirable power lag may occur before the intake air flow builds to the required level.

It has been recognized previously that a turbocharged engine system may be adapted to store compressed air and to use the stored, compressed air to supplement the air charge from the turbocharger compressor. For example, Pursifull et al. describe a system in US 2011/0132335 wherein compressed air is stored in a boost reservoir and is dispensed into the intake manifold when insufficient compressed air is available from the turbocharger compressor. In particular, the boost reservoir is charged with fresh intake air and/or effluent from one or more un-fueled cylinders. By dispensing extra compressed air from the boost reservoir to the intake manifold, torque corresponding to the dispensed air can be provided to meet the torque demand while the turbine spins up.

However, the inventors herein have identified potential issues with such a system. As one example, the boost air may be consumed at a faster rate downstream of a compressor as compared to upstream of a turbine. As a result, when delivered into the intake manifold, the boost air may be initially able to supply sufficient air to provide increased desired torque, but after the supply is depleted, such as at higher engine speeds, the turbine may still not be spun up, and thus torque may drop following the initial increase. Such performance may be worse than no compensation at all. The depletion may be even faster if the boost reservoir has a small volume. Further still, if the charge in the reservoir has a large percentage of exhaust gas, delivering the boost air to the intake may not be able to compensate turbo lag due to the lack of sufficient excess oxygen in the discharged boost air.

Thus, at least some of the above issues may be addressed by a method for a turbocharged engine. In one embodiment, the method comprises, during a first tip-in, discharging pressurized charge from a boost reservoir to an intake manifold; and during a second tip-in, discharging pressurized charge from a boost reservoir to an exhaust manifold. In this way, pressurized charge is discharged into the intake or the exhaust manifold to rapidly increase exhaust temperature or pressure and expedite turbine spin-up.

For example, based on the composition of charge stored in the boost reservoir, a controller may decide whether to deliver the charge to the intake manifold or the exhaust manifold in response to a tip-in. As an example, when the boost reservoir is charged with a higher percentage of fresh air, the boost air may be applied to the intake manifold to provide increased torque to address turbo lag while the turbine spools up. In comparison, when the boost reservoir is charged with a higher percentage of combusted exhaust gas, the boost air may be applied to the exhaust manifold to enable energy from the boost charge pressure to be extracted and advantageously applied to expedite turbine spool-up. A simultaneous throttle adjustment may be performed to compensate for the increased exhaust pressure reducing the amount of air that can be inducted into the engine intake, and therefore the amount of torque delivered. For example, an opening of the throttle may be simultaneously increased to increase air inducted and torque output from the engine.

The selection of whether to discharge the boost air to the intake manifold or the exhaust manifold may also be based on a pressure of the charge stored in the reservoir. For example, if the pressure is higher than a threshold, the higher pressure charge may be discharged into the intake manifold to rapidly raise exhaust temperatures and reduce turbo lag. In comparison, if the pressure is lower than the threshold, the lower pressure charge may be discharged into the exhaust manifold to rapidly raise exhaust pressure and reduce turbo lag. Alternatively, the selection may be based on a boost level at the time of tip-in. For example, if the boost level is higher than a threshold, the boost reservoir charge may be discharged into the intake manifold, while if the boost level is lower than the threshold, the charge may be discharged into the exhaust manifold. Further still, the selection may be based on other engine operating conditions, such as engine speed, exhaust temperature, etc.

In still further embodiments, pressurized charge may be discharged to each of the intake manifold and the exhaust manifold during a single tip-in. Specifically, a portion of the charge stored in the boost reservoir may be discharged to the intake manifold and a remaining portion of the stored charge may be discharged to the exhaust manifold. In this case, the controller may decide whether to discharge to the intake manifold first or the exhaust manifold first based on the factors discussed above.

In this way, by pre-storing an amount of intake air and/or combusted exhaust gas in a reservoir and discharging into the engine intake or exhaust manifold based on operating conditions, turbo lag may be reduced even if boost is already present. Overall, engine performance may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
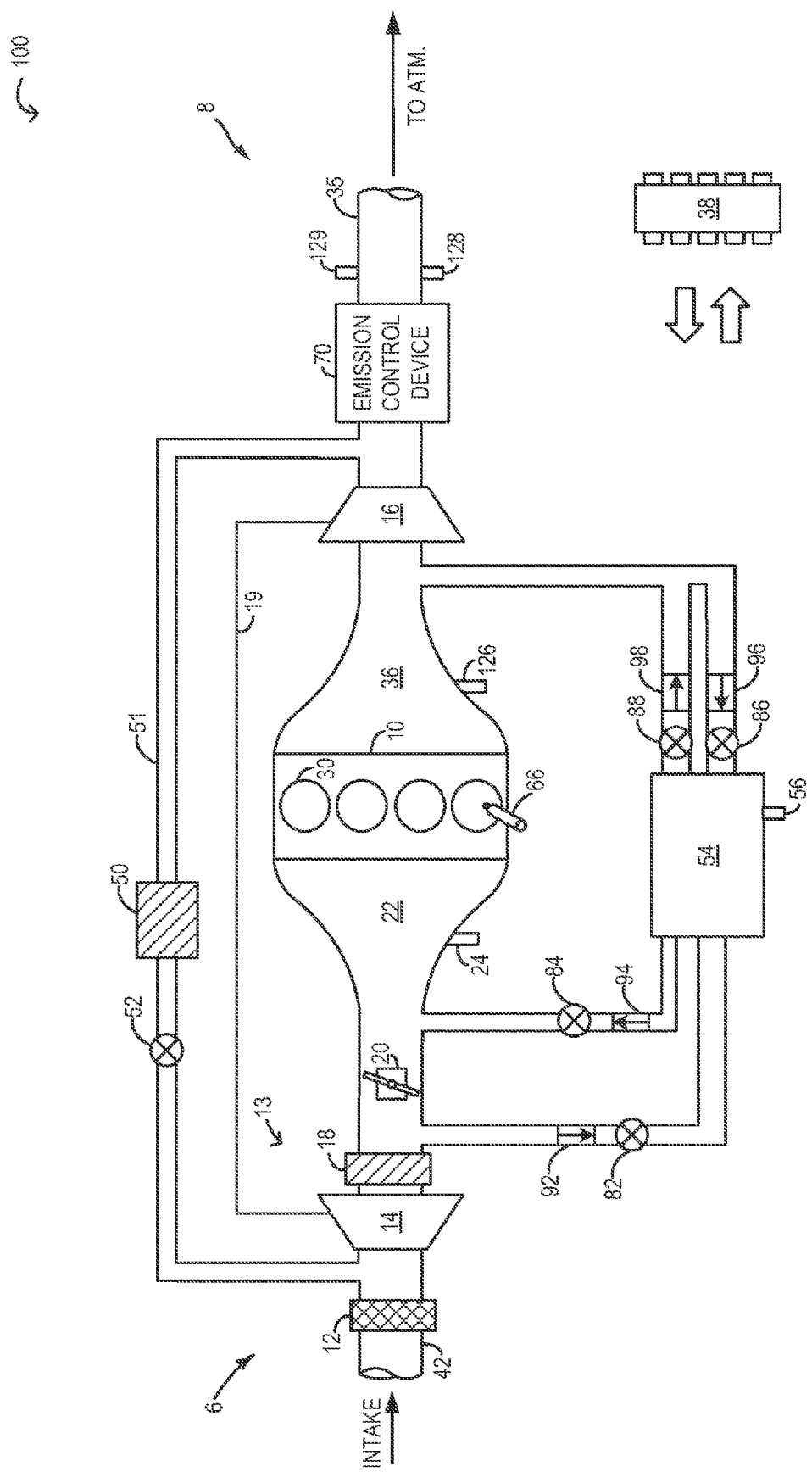
FIG. 1 schematically shows aspects of an example engine system in accordance with an embodiment of this disclosure.

The following description relates to systems and methods for reducing turbo lag in a boosted engine including a boost air reservoir, such as in the engine system of FIG. 1. By discharging pressurized charge from the boost reservoir to the intake manifold or exhaust manifold in response to a tip-in, exhaust gas temperatures and pressures can be quickly raised, and a boosting device turbine can be rapidly spun-up. An engine controller may be configured to perform a control routine, such as the example method of FIG. 2, to charge the boost air reservoir with one or more of combusted exhaust gas from the exhaust manifold or fresh intake air from the intake manifold, when charging opportunities are available. The controller may be further configured to perform a control routine, such as the example method of FIG. 3, to discharge the pressurized charge from the reservoir into the intake manifold and/or the exhaust manifold based on engine operating conditions as well as the composition of charge available in the reservoir. When discharging to the intake manifold, the controller may be configured to perform a control routine, such as the example method of FIG. 4, to discharge pressurized charge into the intake manifold from the reservoir while holding an intake throttle closed, and then opening the throttle once throttle inlet pressures have been sufficiently raised. This coordination allows throttle inlet pressures to be advantageously raised while torque demand is met by charge discharged from the boost reservoir. As shown in FIG. 5, during selected boost conditions, when high pressure EGR is requested, the controller may also be configured to raise a pressure of combusted exhaust gas stored in the reservoir by mixing it with compressed intake air, and then delivering the high pressure charge mixture to the intake manifold. Example charging and discharging operations are shown with reference to FIGS. 6-8. By increasing exhaust temperature and pressures, turbine spin-up may be expedited to reduce turbo lag. By using the boost reservoir to enable high pressure EGR to be provided during boosted operating conditions, boosted engine performance may be improved.

FIG. 1 schematically shows aspects of an example engine system 100 including an engine 10. In the depicted embodiment, engine 10 is a boosted engine coupled to a turbocharger 13 including a compressor 14 driven by a turbine 16. Specifically, fresh air is introduced along intake passage 42 into engine 10 via air cleaner 12 and flows to compressor 14. The compressor may be any suitable intake-air compressor, such as a motor-driven or driveshaft driven supercharger compressor. In engine system 10, however, the compressor is a turbocharger compressor mechanically coupled to turbine 16 via a shaft 19, the turbine 16 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed.

As shown in FIG. 1, compressor 14 is coupled, through charge-air cooler 18 to throttle valve 20. Throttle valve 20 is coupled to engine intake manifold 22. From the compressor, the compressed air charge flows through the charge-air cooler and the throttle valve to the intake manifold. The charge-air cooler may be an air-to-air or air-to-water heat exchanger, for example. In the embodiment shown in FIG. 1, the pressure of the air charge within the intake manifold is sensed by manifold air pressure (MAP) sensor 24. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold section may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

FIG. 1 shows electronic control system 38, which may be any electronic control system of the vehicle in which engine system 10 is installed. In embodiments where at least one intake or exhaust valve is configured to open and close according to an adjustable timing, the adjustable timing may be controlled via the electronic control system to regulate an amount of exhaust present in a combustion chamber during ignition. The electronic control system may also be configured to command the opening, closure and/or adjustment of various other electronically actuated valves in the engine system—throttle valves, compressor by-pass valves, waste gates, EGR valves and shut-off valves, various reservoir intake and exhaust valves, for example—as needed to enact any of the control functions described herein. Further, to assess operating conditions in connection with the control functions of the engine system, the electronic control system may be operatively coupled to a plurality of sensors arranged throughout the engine system—flow sensors, temperature sensors, pedal-position sensors, pressure sensors, etc.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 16 to drive the turbine. When reduced turbine torque is desired, some exhaust may be directed instead through a waste gate (not shown), by-passing the turbine. The combined flow from the turbine and the waste gate then flows through emission control device 70. In general, one or more emission control devices 70 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regenerable soot filter configured to trap and oxidize soot particles in the exhaust flow.

All or part of the treated exhaust from emission control device 70 may be released into the atmosphere via exhaust conduit 35. Depending on operating conditions, however, some exhaust may be diverted instead to EGR passage 51, through EGR cooler 50 and EGR valve 52, to the inlet of compressor 14. In this manner, the compressor is configured to admit exhaust tapped from downstream of turbine 16. The EGR valve may be opened to admit a controlled amount of cooled exhaust gas to the compressor inlet for desirable combustion and emissions-control performance. In this way, engine system 10 is adapted to provide external, low-pressure (LP) EGR. The rotation of the compressor, in addition to the relatively long LP EGR flow path in engine system 10, provides excellent homogenization of the exhaust gas into the intake air charge. Further, the disposition of EGR take-off and mixing points provides very effective cooling of the exhaust gas for increased available EGR mass and improved performance.

In engine system 10, compressor 14 is the primary source of compressed intake air, but under some conditions, the amount of intake air available from the compressor may be inadequate. Such conditions include periods of rapidly increasing engine load, such as immediately after start-up, upon tip-in, or upon exiting deceleration fuel shut-off (DFSO). As such, during a DFSO operation, fuel injection to one or more engine cylinders is selectively deactivated responsive to selected vehicle deceleration or braking conditions. During at least some of these conditions of rapidly increasing engine load, the amount of compressed intake air available from the compressor may be limited due to the turbine not being spun up to a sufficiently high rotational speed (for example, due to low exhaust temperature or pressure). As such, the time required for the turbine to spin up and drive the compressor to provide the required amount of compressed intake air is referred to as turbo lag. During turbo-lag, the amount of torque provided may not match the torque demand, leading to a drop in engine performance.

In view of the issues noted above, engine system 100 includes boost reservoir 54. The boost reservoir may be any reservoir of suitable size configured to store pressurized charge for later discharge. As used herein, the pressurized charge refers to the gas stored in reservoir 54. As such, the pressurized charge stored in boost reservoir may include only clean intake air (e.g., compressed intake air drawn from the intake manifold), only combusted exhaust gas (e.g., combusted exhaust gases drawn from the exhaust manifold), or a combination thereof (e.g., a mixture of intake air and exhaust gas having a defined EGR percentage). In one embodiment, the boost reservoir may be configured to store charge at the maximum pressure generated by compressor 14. Various inlets, outlets, and sensors may be coupled to the boost reservoir, as elaborated below. In the embodiment shown in FIG. 1, pressure sensor 56 is coupled to the boost reservoir and configured to respond to the charge pressure there-within.

In engine system 100, boost reservoir 54 is selectably coupled to intake manifold 22 upstream and downstream of intake throttle valve 20. More specifically, the boost reservoir 54 is configured to discharge pressurized charge to the intake manifold, downstream of the intake throttle valve 20, via boost reservoir intake discharge valve 84. The boost reservoir intake discharge valve may be a normally closed valve commanded to open when a flow of charge from the boost reservoir to the intake manifold is desired. In some scenarios, the pressurized charge may be delivered when the throttle valve is at least partially open. Therefore, check valve 94 may be coupled upstream of the throttle valve and oriented to prevent the release of pressurized charge from the boost reservoir backwards through the throttle valve. In other embodiments, the check valve may be omitted and other measures taken to prevent backwards flow through the throttle valve. In some embodiments, a pressure recovery cone (not shown) may be fluidically coupled between the boost reservoir and the intake manifold so that pressurized charge is conducted through the pressure recovery cone on discharge from the boost reservoir. When included, the pressure recovery cone converts flow energy back to pressure energy during flow conditions by suppressing flow detachment from the conduit walls. In alternate embodiments, however, the pressure recovery cone may not be included.

In still further embodiments, such as when the pressurized charge is being delivered to the intake manifold during boosted engine operating conditions, the pressurized charge may be delivered with the intake throttle valve held closed for a duration. As elaborated at FIG. 5, the throttle may be held closed until the boost reservoir is fully discharged or until a threshold throttle inlet pressure is attained. Then, the intake discharge valve can be closed while the intake throttle valve is opened to allow compressed intake air from the compressor to be discharged into the intake manifold. By temporarily holding the throttle closed while the pressurized charge is discharged into the boosted engine, reverse flow into the reservoir can be reduced while also allowing a pressure of the compressed intake air to be raised higher than would be otherwise possible. A combination of the high pressure discharge from the reservoir followed by high pressure air from the compressor allows a torque demand at tip-in to be better met while also expediting turbine spin-up and reducing turbo lag.

In some embodiments, holding the throttle valve closed for the duration can lead to compressor surge issues when the throttle is subsequently opened. If the boost operation at throttle opening is surge limited, the controller may open a compressor relief valve while opening the throttle to address the compressor surge.

Boost reservoir 54 may also be charged with air drawn from the intake manifold, downstream of compressor 14 and charge air cooler 18. More specifically, the boost reservoir 54 is configured to be charged with compressed intake air from the intake manifold, drawn from downstream of compressor 14 and upstream of intake throttle valve 20, via boost reservoir intake charge valve 82. The boost reservoir intake charge valve 82 may be a normally closed valve commanded to open when a flow of pressurized intake aircharge from the intake manifold to the boost reservoir is desired. In one example, during low boost conditions, the intake charge valve may be opened to drive at least some intake air pressurized by the compressor into boost reservoir 54. As another example, during high boost conditions, the intake charge valve may be opened to drive some compressed intake air into boost reservoir 54 wherein it is mixed with pre-stored combusted exhaust gas to generate high pressure EGR. Then, during boosted conditions when a transient EGR request is received, the high pressure EGR is discharged into the intake manifold via intake discharge valve 84 to provide the requested high pressure EGR. A check valve 92 coupled upstream of intake charge valve 82 allows compressed air from the compressor to flow into the boost reservoir under conditions of high throttle-inlet pressure (TIP) and to be stored therein, but it prevents stored compressed air from flowing back to the compressor under conditions of low TIP.

Boost reservoir 54 is also shown selectably coupled to exhaust manifold 36 upstream of turbine 16. More specifically, the boost reservoir 54 is configured to discharge pressurized charge to the exhaust manifold, upstream of turbine 16, via boost reservoir exhaust discharge valve 88. The boost reservoir exhaust discharge valve 88 may be a normally closed valve commanded to open when a flow of charge from the boost reservoir to the exhaust manifold is desired. Check valve 98 may be coupled downstream of the exhaust discharge valve and oriented to prevent the backward flow of the pressurized charge into the boost reservoir. In other embodiments, the check valve may be omitted and other measures taken to prevent backwards flow to the reservoir.

Boost reservoir 54 may also be charged with combusted exhaust gases drawn from the exhaust manifold, upstream of turbine 16. More specifically, the boost reservoir 54 is configured to be charged with combusted exhaust gases drawn from the exhaust manifold, upstream of turbine 16, via boost reservoir exhaust charge valve 86. The boost reservoir exhaust charge valve 86 may be a normally closed valve commanded to open when a flow of combusted exhaust gas from the exhaust manifold to the boost reservoir is desired. In one example, during low boost conditions, or low engine speed-load conditions, the exhaust charge valve may be opened to drive at least some combusted exhaust gas into boost reservoir 54. In this way, the EGR percentage of the boost reservoir charge may be increased. A check valve 96 coupled upstream of exhaust charge valve 86 allows combusted exhaust gas from the intake manifold to flow into the boost reservoir and to be stored therein, but it prevents the exhaust gas from flowing back.

In this way, during a first condition, the boost reservoir may be selectively charged with only intake air from the intake manifold, downstream of a compressor, while during a second condition, the boost reservoir may be selectively charged with only combusted exhaust gas from the exhaust manifold, upstream of a turbine.

In fact, the configuration of boost reservoir 54 vis-à-vis the engine intake and exhaust manifolds enables various options for charging and discharging the boost reservoir. As a first example, such as when the engine system is operated in a first mode, the reservoir may be charged with compressed intake air from the intake manifold, and then responsive to a tip-in (or during high boost conditions), the compressed intake air may be discharged to the intake manifold to reduce turbo lag and assist in turbine spin-up. As a second example, such as when the engine system is operated in a second mode, the reservoir may be charged with compressed intake air from the intake manifold, the compressed intake air may be discharged to the exhaust manifold to raise exhaust temperatures and assist in turbine spin-up. As a third example, such as when the engine system is operated in a third mode, the reservoir may be charged with combusted exhaust gas from the exhaust manifold, and then during boosted conditions, when EGR is requested, the combusted exhaust gas may be discharged to the intake manifold to provide the desired EGR. As a fourth example, such as when the engine system is operated in a fourth mode, the reservoir may be charged with combusted exhaust gas from the exhaust manifold, and then responsive to a tip-in, the combusted exhaust gas may be discharged to the exhaust manifold to raise the exhaust pressure upstream of the turbine, and assist in turbine spin-up. In still further examples, the reservoir may be charged with at least some combusted exhaust gas and at least some compressed intake air to provide a boost charge of a selected composition (e.g., desired EGR percentage, desired AFR, etc.) and then, at a later time, the pressurized charge may be discharged to either the intake manifold (for example, to provide EGR) or to the exhaust manifold (for example, to raise the exhaust pressure).

In some embodiments, boost reservoir 54 may also be charged with the effluent of one or more unfueled cylinders (that is, charged with unfueled and uncombusted exhaust gas). Specifically, when engine 10 is operated in DFSO mode, where some of the combustion chambers receive no fuel and merely pump the air admitted through their respective intake valves, the air pumped and thereby compressed by the unfueled combustion chambers may be drawn from exhaust manifold via exhaust charge valve 86 and stored in reservoir 54.

In the various engine systems discussed above, and in others fully consistent with this disclosure, pressurizing air or an air/exhaust mixture in a boost tank may cause water vapor to condense inside the boost tank. Therefore in some embodiment, a drain valve (not shown) may be coupled to boost reservoir 54. The drain valve may be opened as needed by electronic control system 38 to drain condensate from the boost tank onto the road surface below the vehicle in liquid form, or directed to the exhaust system of the vehicle, evaporated, and discharged as a vapor.

The configuration of FIG. 1 enables air stored in the boost reservoir to be discharged in response to at least a tip-in condition, where the throttle valve opens suddenly and the compressor is spinning too slowly to provide the desired intake manifold pressure (MAP). As elaborated herein below, during at least some tip-in conditions (such as when the boost level at tip-in is lower and anticipated turbo lag is higher), while discharging air from the boost reservoir, a higher amount of spark retard may be used to rapidly raise the temperature of exhaust gas and expedite turbine spin-up. During other tip-in conditions (such as when the boost level at tip-in is higher and anticipated turbo lag is lower), while discharging air from the boost reservoir, a smaller amount of spark retard (e.g., no spark retard) may be used to provide additional engine torque (corresponding to the discharged amount of boost air) to meet the torque demand while the compressor reaches the desired capacity.

In some embodiments, at least some cylinders of the engine may be configured to have spark timing retarded while boost air is discharged into the intake manifold for purposes of heating exhaust gas and expediting turbine spin. At the same time, other cylinders may be configured to maintain ignition timing while boost air is discharged for the purposes of torque generation. To reduce potential issues arising from a torque differential between the cylinders, the cylinders enabling exhaust gas heating and the cylinder enabling torque generation may be selected based their firing order. In this way, by expediting turbine spin-up, while providing torque, turbo lag can be reduced while increasing net engine combustion torque.

The configurations described above enable various methods for providing charge including air and/or combusted exhaust gas to a combustion chamber of an engine or for spinning up a turbine. Accordingly, some such methods are now described, by way of example, with continued reference to the above configuration. It will be understood, however, that the methods here described, and others fully within the scope of this disclosure, may be enabled via other configurations as well. The methods presented herein include various measuring and/or sensing events enacted via one or more sensors disposed in the engine system. The methods also include various computation, comparison, and decision-making events, which may be enacted in an electronic control system operatively coupled to the sensors. The methods further include various hardware-actuating events, which the electronic control system may command selectively, in response to the decision-making events.

Figure 2:
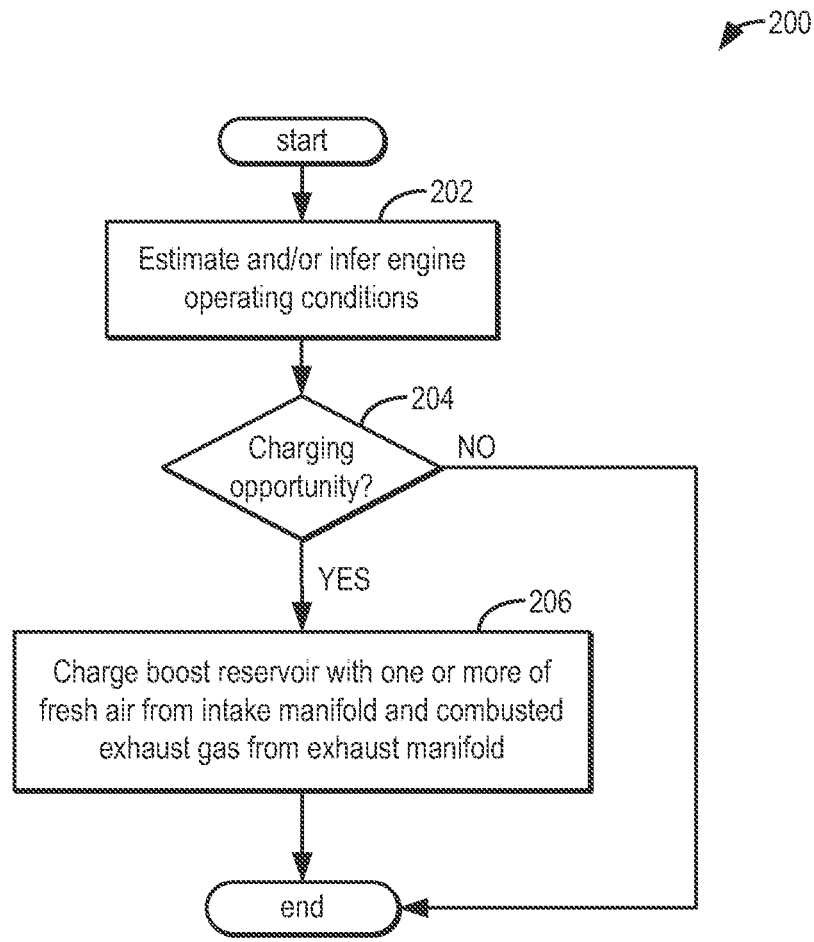
FIG. 2 illustrates an example method for charging a boost reservoir with one or more of combusted exhaust gas and fresh intake air.

Now turning to FIG. 2, an example routine 200 is shown for charging the boost reservoir of FIG. 1. By charging the boost reservoir with combusted exhaust gas from the exhaust manifold, exhaust energy may be pre-stored in the reservoir and discharged at a later time to either provide EGR (when discharged into the intake manifold) or raise exhaust pressure (when discharged into the exhaust manifold). By charging the boost reservoir with pressurized intake air from the intake manifold, boost energy may be pre-stored in the reservoir and discharged at a later time to either provide extra boost (when discharged into the intake manifold) or raise exhaust pressure (when discharged into the exhaust manifold). In particular, turbine energy can be increased by increasing the pre-turbine exhaust pressure. In each case, by storing charge in the boost reservoir for use at a later time, boosted engine performance can be improved.

At 202, routine 200 includes estimating and/or inferring engine operating conditions. These may include, for example, engine speed, torque demand, boost demand, exhaust temperature, barometric pressure, boost reservoir conditions, etc.

In one example, boost reservoir conditions may be estimated using one or more sensors coupled to the reservoir, such as pressure, temperature, and air-fuel ratio sensors. However, in other examples, one or more boost reservoir conditions may be inferred or retrieved from a memory of the controller rather than being sensed per se. For example, where the boost reservoir was previously charged using air from the intake manifold, based on compressor conditions, intake air temperature and pressure conditions, as well as EGR demands at the time of charging, a state of the charge in the boost reservoir may be inferred. As another example, where the boost reservoir was previously charged with combusted exhaust gas from the exhaust manifold, based on engine operating conditions, exhaust conditions, and EGR demands at the time of charging, a state of the charge in the boost reservoir may be inferred. Likewise, where the boost reservoir was previously discharged to the intake manifold, based on the duration of discharging as well as boost conditions during the discharging, a state of charge (if any) remaining in the boost reservoir may be inferred. In the same way, where the boost reservoir was previously discharged to the exhaust manifold, based on the duration of discharging as well as engine conditions during the discharging, a state of charge (if any) remaining in the boost reservoir may be inferred.

At 204, based on the estimated conditions, it may be determined if a boost reservoir charging opportunity is present. In one example, reservoir charging conditions may be present if the boost reservoir is sufficiently empty (e.g., boost reservoir pressure being lower than a threshold). As another example, reservoir charging conditions may be present if the engine is operating at a sufficiently high boost level (e.g., operating with boost at higher than a threshold level). As yet another example, reservoir charging conditions may be confirmed during an engine DFSO operation. As still another example, reservoir charging conditions may be confirmed during a transient following a tip-out event. As such, based on engine operating conditions at the time the charging opportunity is confirmed, it may be determined whether the charge the boost reservoir with compressed air from the intake manifold and/ or combusted exhaust gas from the exhaust manifold. For example, as elaborated below, the boost reservoir may be selectively charged based on engine speed, vehicle speed, manifold pressure, etc. at the time of the charging opportunity.

If charging conditions are confirmed, then at 206, the boost reservoir may be charged with one or more of compressed intake air from the intake manifold and combusted exhaust gas from the exhaust manifold. Specifically, the reservoir intake charge valve may be opened for a duration to charge the reservoir with compressed intake air from the intake manifold, and/or the reservoir exhaust charge valve may be opened for a duration to charge the reservoir with exhaust gas from the exhaust manifold. A duration of opening of the intake charge valve and/or the exhaust charge valve may be adjusted to adjust the composition of charge stored in the reservoir so as to provide a desired boost reservoir charge EGR percentage (or dilution). In one example, the boost reservoir may be charged with air and combusted exhaust gas to provide charge of a desired EGR percentage and desired pressure, such that when the pressurized charge is eventually discharged during a subsequent boosted engine operation, high pressure EGR can be enabled.

For example, during a first condition, when a tip-in is predicted at high engine speeds, the boost reservoir may be charged with combusted exhaust gases only. Herein, the engine may be operating at higher engine speeds with a pedal position near a closed position and with a vehicle speed being higher than a threshold speed but with an exhaust pressure being greater than a threshold pressure. In comparison, during a second condition, when a tip-in is predicted at low engine speeds, the boost reservoir may be charged with fresh intake air and combusted exhaust gases, with a ratio of the fresh intake air to combusted exhaust gases adjusted based on a desired boost reservoir EGR percentage. Alternatively, during the second condition, the boost reservoir may be charged with fresh intake air only. Herein, the engine may be operating at lower engine speeds with the pedal position near a closed position and with a vehicle speed being lower than a threshold speed but with an intake manifold pressure being greater than a threshold pressure. For example, the engine may be operating with positive intake to exhaust manifold pressure.

As elaborated at FIG. 5, during some conditions, the boost reservoir may be charged with a first amount of combusted exhaust gas at a first, lower pressure from the exhaust manifold, upstream of the turbine. This initial charging increases the EGR percentage of the reservoir charge but the stored exhaust gas is at a lower pressure. To further raise the pressure of the stored charge, the boost reservoir may be subsequently further charged with a second amount of fresh intake air at a second, higher pressure from the intake manifold, downstream of the compressor. This later charging slightly decreases the EGR percentage of the reservoir charge but raises the charge pressure. The first and second amounts may be adjusted to provide a desired EGR percentage of the pressurized charge. The stored charge can then be advantageously discharged during selected boosted engine conditions to provide high pressure EGR benefits.

As another example, the boost reservoir may be charged with at least some combusted exhaust gases (e.g., with only combusted exhaust gases) during a tip-out at lower engine speeds. In comparison, during a tip-out at higher engine speeds, the controller may charge the boost reservoir with at least some compressed intake air from the intake manifold (e.g., with only compressed intake air). As yet another example, when charging conditions are confirmed during an engine DFSO operation, the reservoir may be charged with uncombusted exhaust gas released from the cylinders having fuel shut-off.

As such, following the charging, boost reservoir conditions may be updated in the controller's memory. In one example, boost reservoir conditions may be updated using one or more sensors coupled to the reservoir, such as pressure, temperature, and air-fuel ratio sensors. However, in other examples, boost reservoir conditions may be inferred and updated in the memory of the controller rather than being sensed per se. For example, where the boost reservoir was recently charged using air from the intake manifold, based on compressor conditions, intake air temperature and pressure conditions, as well as EGR demands at the time of charging, a state of the charge in the boost reservoir may be inferred and updated. As another example, where the boost reservoir was currently charged with combusted exhaust gas from the exhaust manifold, based on engine operating conditions, exhaust conditions, and EGR demands at the time of charging, a state of the charge in the boost reservoir may be inferred and updated.

In one example, the EGR percentage of the boost reservoir may be estimated or inferred based on one or more an exhaust air-fuel ratio sensor output, MAF, and a fuel injector pulse-width. The controller may be configured to estimate a volume of gas that was stored in the reservoir based on a boost reservoir pressure. The controller may then estimate how much of that volume was air based on MAF changes following discharging of the pressurized charge, and how much of that volume included fuel based on fuel injection adjustments following discharging of the pressurized charge (e.g., based on a fuel injector pulse-width). An air-to-fuel ratio estimated may then be based on the air and fuel estimates. In an alternate example, the estimated air-to-fuel ratio may be based on the output of an intake oxygen sensor. The estimated air-to-fuel ratio may then be compared to a measured air-to-fuel ratio to map an error. The error may then be used to update an EGR percentage estimate of the boost reservoir charge. The stored boost reservoir conditions may be retrieved by the controller during a subsequent discharging operation. It will be appreciated that in all cases, the charging may be performed during an engine cycle preceding a tip-in event where the pressurized charge is discharged.

In this way, a boost reservoir may be selectively charged with one or more of fresh intake air from an intake manifold and combusted exhaust gas from an exhaust manifold. The charging with fresh intake air and combusted exhaust gas may be performed to enable storing of a boost reservoir charge having a selected EGR percentage. As elaborated herein with reference to FIG. 3, following the selective charging, such as in response to a tip-in, the pressurized charge may be discharged from the boost reservoir to the intake manifold and/or the exhaust manifold, based on engine operating conditions at the time of the tip-in, to thereby reduce turbo lag and improve boosted engine performance.

Figure 3:
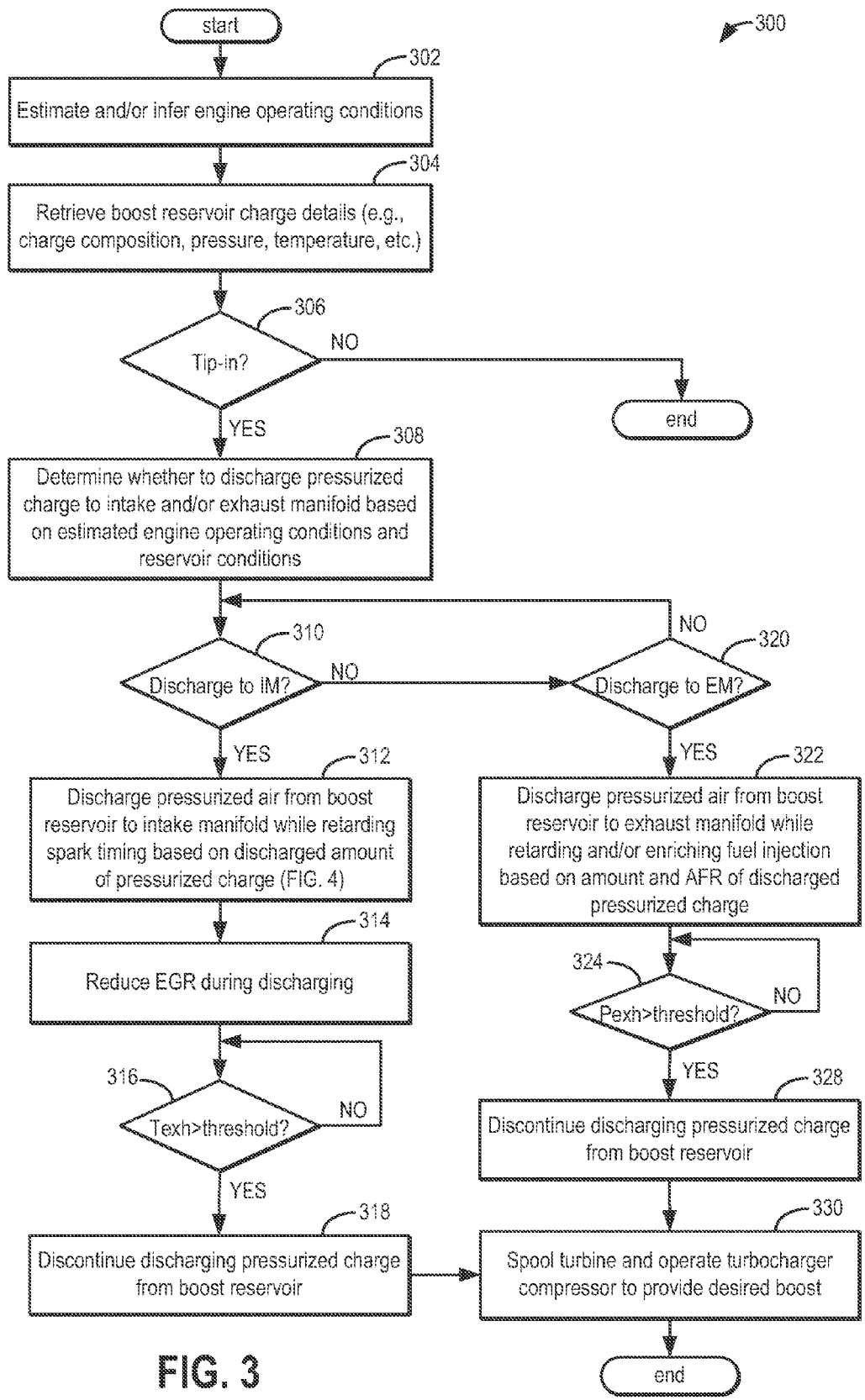
FIG. 3 illustrates an example method for discharging pressurized charge from a boost reservoir into an intake or an exhaust manifold.

Now turning to FIG. 3, an example routine 300 is shown for discharging the boost reservoir of FIG. 1. By discharging the boost reservoir into the intake manifold or the exhaust manifold, based at least on a composition of charge in the boost reservoir, boost charge may be advantageously used to raise exhaust temperature or pressure. In each case, by discharging from the boost reservoir in response to a tip-in, turbo lag can be reduced and boosted engine performance can be improved.

At 302, engine operating conditions may be estimated and/or inferred. These may include, for example, engine speed, torque demand, boost demand, exhaust temperature, barometric pressure, boost reservoir conditions, etc. At 304, boost reservoir charge details may be retrieved. As such, the pressurized charge may include a variable mixture of combusted exhaust gas and compressed intake air, thereby having a distinct charge pressure and charge EGR percentage (or dilution). The retrieved details may include, for example, a charge composition including a fresh air content of the charge as well as a combusted exhaust gas content of the charge. The retrieved details may further include charge temperature, charge pressure, charge EGR percentage, etc. As previously elaborated, the boost reservoir details may be stored in the controller's memory and may be inferred and updated following each charging operation. In addition, following any discharging operation, the boost reservoir details may be updated to reflect the most recent state of the charge remaining (if any) in the boost reservoir.

At 306, a tip-in may be confirmed. In one example, a tip-in may be confirmed in response to an accelerator pedal being displaced beyond a threshold position and a torque demand being higher than a threshold. If a tip-in is not confirmed, the routine may end. Upon confirming the tip-in, at 308, the routine includes determining whether to discharge the pressurized charge to the intake or the exhaust manifold.

In one example, the selection (of whether to discharge to the intake or the exhaust manifold) may be based on a composition (or EGR percentage) of charge stored in the boost reservoir. For example, when the boost reservoir has a high fresh air content (e.g., when the fresh air percentage of the stored charge is higher than a threshold amount) or a low EGR content (e.g., when the EGR percentage of the stored charge is lower than a threshold amount), the boost air may be applied to the intake manifold to provide increased torque to address turbo lag while the turbine spools up. As another example, when the boost reservoir has a low fresh air content (e.g., when the fresh air percentage of the stored charge is lower than the threshold amount) or a high EGR content (e.g., when the EGR percentage of the stored charge is higher than the threshold amount), the boost air may be applied to the exhaust manifold to enable energy from the boost charge pressure to be extracted and advantageously applied to expedite turbine spool-up. Thus, during a first tip-in, when the discharged charge has a lower EGR percentage, the discharging is performed into the intake manifold, while during a second tip-in, when the discharged charge has a higher EGR percentage, the discharging is performed into the exhaust manifold.

In still another example, the selection of whether to discharge the boost air to the intake manifold or the exhaust manifold may be further based on a charge pressure of the pressurized charge stored in the reservoir. For example, when the boost reservoir charge pressure is higher than a threshold pressure, the higher pressure charge may be selectively discharged to the intake manifold to rapidly raise exhaust temperatures and reduce turbo lag. In an alternate example, when the boost reservoir charge pressure is lower than the threshold pressure, the lower pressure charge may be selectively discharged to the exhaust manifold to rapidly raise exhaust pressure and reduce turbo lag.

In a further example, the selection may be based on a boost level at the time of tip-in. For example, when the boost level at the time of tip-in is higher than a threshold boost level, the boost reservoir charge may be discharged into the intake manifold. In comparison, when the boost level at the time of tip-in is lower than the threshold level, the boost charge may be discharged into the exhaust manifold. In an alternate example, an engine boost level at a first tip-in where the pressurized charge is discharged to the intake manifold may be lower than the engine boost level at a second tip-in where the pressurized charge is discharged to the exhaust manifold.

In still further embodiments, the selection of whether to discharge the boost charge to the intake or exhaust manifold may be based on other engine operating conditions, such as engine speed, exhaust temperature, and exhaust air-to-fuel ratio.

As yet another example, the selection may be further based on an EGR demand at the time of tip-in. For example, the boost reservoir may be charged with combusted exhaust gas and compressed intake air to store charge of a defined charge pressure and defined charge EGR percentage. Then, when the boost level at a tip-in is lower than the boost reservoir charge pressure, the pressurized charge may be discharged to the intake manifold if EGR is requested, and discharged to the exhaust manifold if EGR is not requested. In comparison, when the boost level at tip-in is higher than the boost reservoir charge pressure, the pressurized charge may be discharged to the exhaust manifold only.

It will be appreciated that while the depicted routine suggests discharging to either the intake manifold or the exhaust manifold during a tip-in, in some embodiments, the pressurized charge may be discharged to each of the intake manifold and the exhaust manifold during a given tip-in. Specifically, in those embodiments, the pressurized charge may be sequentially discharged to each of the intake and the exhaust manifold during the same tip-in. Accordingly, prior to discharging, it may be determined whether the pressurized charge is to be discharged to the intake manifold first followed by the exhaust manifold, or whether the pressurized charge is to be discharged to the exhaust manifold first followed by the intake manifold. In one example, the order of sequential discharging may be based on boost pressure, exhaust pressure, and boost tank pressure, for example.

At 310, it may be confirmed if the boost reservoir charge is to be discharged to the intake manifold (e.g., if the boost reservoir charge is to be discharged only to the intake manifold, or initially to the intake manifold). If yes, then at 312, the routine includes discharging pressurized charge from the boost reservoir to the intake manifold. Specifically, to the intake manifold, downstream of a turbocharger compressor and downstream of an intake throttle. In addition, during the discharging, spark timing may be retarded based on the amount of pressurized charge discharged from the reservoir. However, the applied spark retard may be less than a spark retard limit based on a combustion torque corresponding to the discharged amount of pressurized air. That is, spark may not be retarded beyond an amount that reduces the net combustion torque. For example, the spark retard may maintain or increase torque above the torque level generated during cylinder operation in the absence of supplementary pressurized air discharged from the boost reservoir. This allows a net combustion torque of the engine to be increased, or at least maintained, during the retarding of ignition timing.

In one example, the discharging to the intake manifold may occur outside of a valve overlap period. For example, the discharging may occur during an intake stroke and/or a compression stroke, but not during portions of these strokes in which both the intake and exhaust valve of the cylinder are concurrently open. As such, this allows the air-fuel mixture to be combusted in the cylinder such that upon release, the heated exhaust gas can be used to spool the turbine on a subsequent combustion event. By discharging the pressurized gas outside of the overlap period, rather than within the overlap period, more air-fuel mixing can be achieved and better exhaust gas heating may be achieved. However, in an alternate example, the discharging to the intake manifold may occur during a valve overlap period. For example, a timing of the discharging may be adjusted to coincide with positive valve overlap. Alternatively, a cam timing of a variable cam timing mechanism may be adjusted based on the discharging to provide high valve overlap when the boost reservoir is discharged. Then, following the discharging, the cam timing of the variable cam timing mechanism may be reset based on engine operating conditions.

Figure 4:
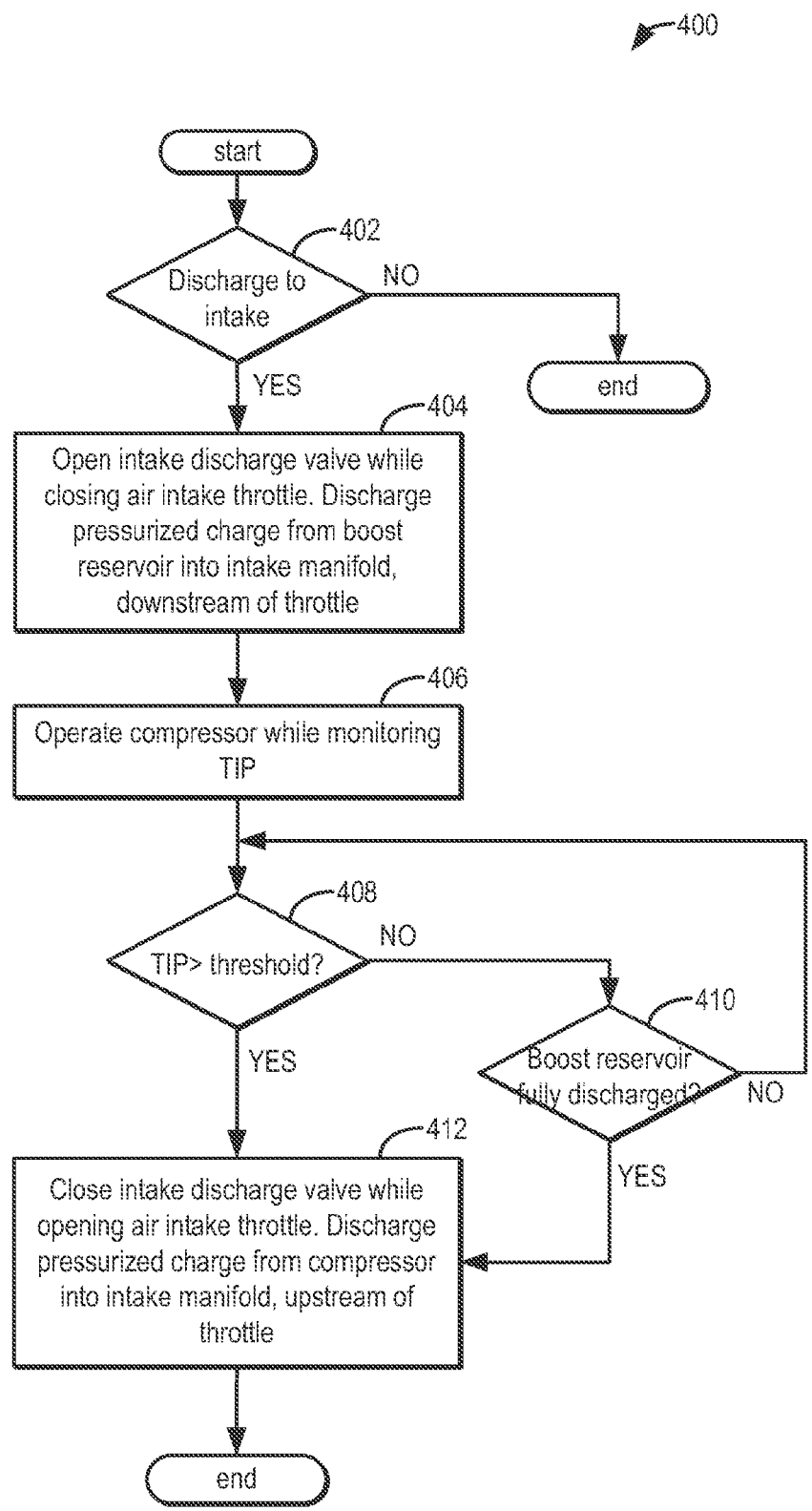
FIG. 4 illustrates an example method for discharging pressurized charge from a boost reservoir to provide high pressure EGR.
Figure 5:
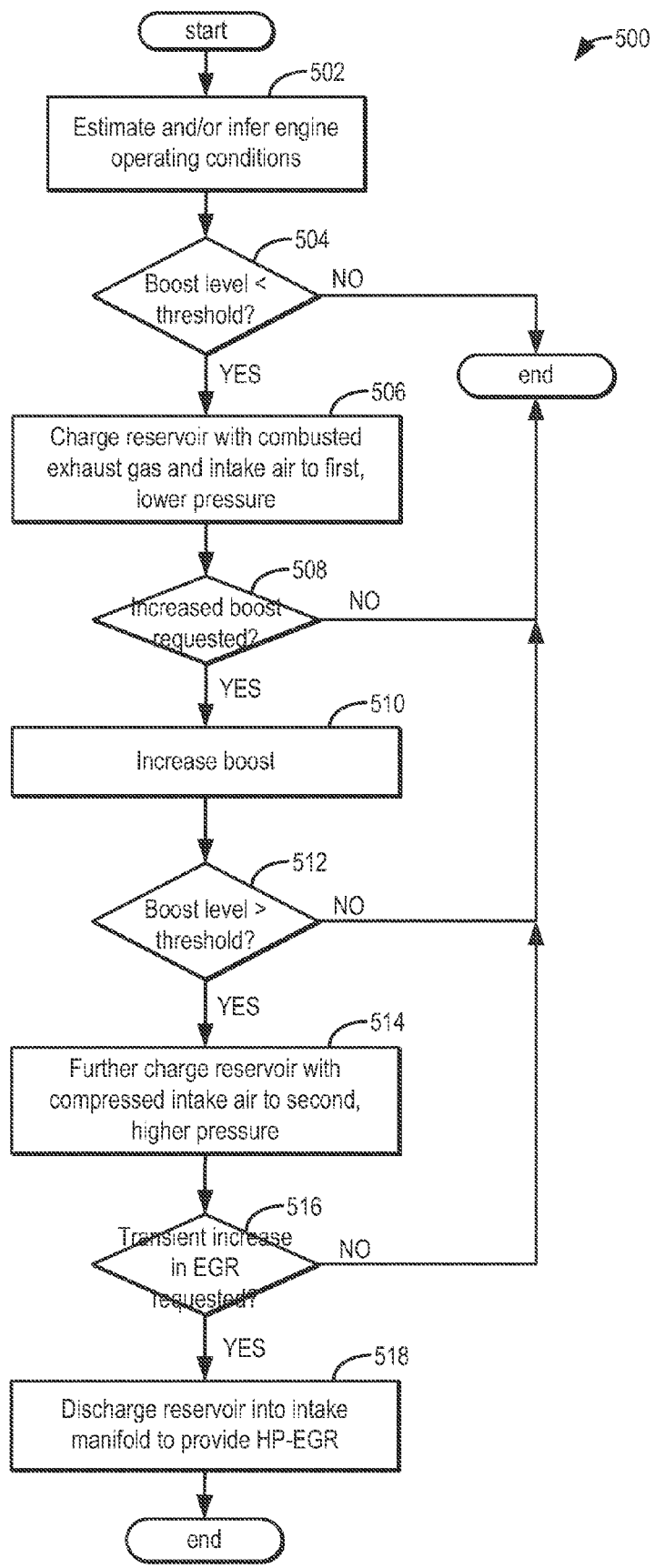
FIG. 5 illustrates an example method for discharging pressurized charge from a boost reservoir to an intake manifold while pre-charging compressor boost pressure.

In one embodiment, as elaborated with reference to FIG. 4, a portion of the pressurized charge may be discharged from the boost reservoir to the intake manifold, downstream of an intake throttle, while holding the intake throttle closed (or while adjusting a position of the throttle towards a more closed position). Then, a remaining portion of the pressurized charge may be discharged after opening the throttle. As also elaborated in the example of FIG. 8, the throttle may be held closed until a threshold throttle inlet pressure is generated upstream of the throttle by the compressor. By holding the throttle closed, a boost pressure generated at the compressor may be raised more rapidly than would be otherwise possible with the throttle open. At the same time, torque demand may be met, and turbine spool-up may be expedited by discharging pressurized charge into the intake manifold.

At 314, during the discharging, an amount of exhaust gas recirculated from the exhaust manifold to the intake manifold may be reduced. In particular, the reducing of EGR may be based on the discharged amount of pressurized air. This allows the combustion stability to be improved and increased spark retard to be used for heating exhaust gas. In one example, where the engine system has an EGR passage including an EGR valve for recirculating an amount of exhaust gas from the engine exhaust manifold to the engine intake manifold, an engine controller may reduce an opening of the EGR valve to reduce the amount of exhaust gas recirculated to the engine intake via the EGR passage.

At 316, it may be determined if a temperature of the exhaust gas (Texh) is higher than a threshold. Herein, the threshold exhaust gas temperature may correspond to a temperature above which the turbine can be spooled and spun-up so as to drive the compressor and provide a desired boost. For example, the threshold temperature may be based on a turbine speed. Thus, if the exhaust temperature is above the threshold temperature, at 318, the discharging of pressurized charge from the boost reservoir to the intake manifold may be discontinued. Additionally, at 330, the turbine may be spooled and the turbocharger compressor may be operated to provide the required amount of boost to meet the torque demand. If the threshold exhaust temperature has not been attained at 316, the discharging of pressurized charge to the intake manifold, while retarding spark, is continued until the exhaust temperature is above the threshold temperature.

Returning to 310, if discharging of the boost reservoir charge to the intake manifold is not confirmed, then at 320, it may be confirmed if the boost reservoir charge is to be discharged to the exhaust manifold (e.g., if the boost reservoir charge is to be discharged only to the exhaust manifold, or initially to the exhaust manifold). If yes, then at 322, the routine includes discharging pressurized charge from the boost reservoir to the exhaust manifold while adjusting a cylinder fuel injection (including a fuel injection amount and/or timing) during the discharging based on the discharged pressurized charge so as to maintain an overall exhaust air-to-fuel ratio (e.g., an exhaust air-to-fuel ratio sensed at an exhaust catalyst) at or around stoichiometry. As used herein, discharging pressurized charge to the exhaust manifold includes discharging the pressurized charge to the exhaust manifold upstream of a turbocharger turbine. In one example, the discharging may be performed during boosted engine operation.

In some embodiments, a simultaneous throttle adjustment may be performed to compensate for the increased exhaust pressure reducing the amount of air that can be inducted into the engine intake, and therefore the amount of torque delivered. For example, an opening of the throttle may be simultaneously increased to increase air inducted and torque output from the engine.

Adjusting the cylinder fuel injection while discharging to the exhaust manifold may include, for example, performing a rich fuel injection and/or a late fuel injection based on an amount and an air-to-fuel ratio of the pressurized charge. By retarding and/or enriching the fuel injection so as to match the (fresh) air component of the charge dissipated from the boost tank into the exhaust manifold, an overall mixture at the exhaust (e.g., at a downstream exhaust catalyst) may be maintained substantially at stoichiometry. Further, the exothermic reaction of the extra oxygen from the air in the boost reservoir with the rich fuel injection generates additional exhaust heat and exhaust pressure which also helps to reduce turbo lag. In one example, the rich fuel injection may be performed when the exhaust temperature is higher than a threshold temperature to better ensure that the exothermic reaction will occur in the exhaust manifold, as desired, and not further downstream. In one example, the fuel injection may be adjusted using feedback from one or more air-to-fuel ratio sensors, such as from air-to-fuel ratio sensors located upstream and/or downstream of the turbine and the exhaust catalyst in the exhaust manifold. As such, air-fuel mixing may be an issue if relying on feedback from an upstream air-to-fuel ratio sensor. Thus, in some embodiments, to enable more reliable feedback signals to be received, during the discharging, the cylinder fuel injection may be adjusted based on feedback from an exhaust air-to-fuel ratio sensor located downstream of the turbocharger turbine in the exhaust manifold.

Next, at 324, it may be determined if a pressure of the exhaust gas (Pexh), upstream of the turbine, is higher than a threshold. Herein, the threshold exhaust gas pressure may correspond to a pressure above which the turbine can be spooled and spun-up so as to drive the compressor and provide a desired boost. For example, the threshold pressure may be based on a turbine speed. Thus, if the exhaust pressure is above the threshold pressure, at 328, the discharging of pressurized charge from the boost reservoir to the exhaust manifold may be discontinued. Additionally, at 330, the turbine may be spooled and the turbocharger compressor may be operated to provide the required amount of boost to meet the torque demand. If the threshold exhaust pressure has not been attained at 324, the discharging of pressurized charge to the exhaust manifold, while retarding and/or enriching cylinder fuel injection, is continued until the exhaust pressure is above the threshold pressure.

It will be appreciated that while the depicted routine illustrates discharging to the exhaust manifold until a threshold exhaust pressure is achieved, in alternate examples, the controller may be configured to continue discharging to the exhaust manifold until the turbine speed reaches a threshold speed or until an intake boost pressure (e.g., at the compressor) reaches a threshold boost pressure. For example, the discharging to the exhaust manifold may be performed during a positive intake manifold to exhaust manifold pressure condition. Herein, when the intake manifold pressure reaches a threshold pressure, and the positive intake to exhaust manifold pressure condition ceases to exist, the discharging to the exhaust manifold is discontinued. That is, an engine controller may be configured to discharge to the exhaust manifold until turbine speed reaches a threshold speed or until intake boost pressure reaches a threshold boost pressure.

In this way, a boost reservoir may be charged with at least some combusted exhaust gases from the exhaust manifold during an engine cycle preceding a tip-in. Then, in response to a tip-in, turbo lag may be reduced by discharging pressurized charge from the boost reservoir to the exhaust manifold. An example engine operation with discharging of a boost reservoir charge to an exhaust manifold is elaborated herein with reference to FIG. 6.

It will be appreciated that in some examples, the pressurized charge may be discharged to each of the intake manifold and the exhaust manifold during the same tip-in. Specifically, on a single tip-in, a portion (e.g., a first amount) of the pressurized charge stored in the boost reservoir may be discharged to the exhaust manifold, while a remaining portion (e.g., a second, different amount) of the stored charge is further discharged to the intake manifold. Herein, the controller may decide whether to discharge to the intake manifold first or the exhaust manifold first based on the same considerations discussed above. Thus, in one example, when the boost reservoir pressure is higher, a portion of the pressurized charge may be discharged to the intake manifold first and then a remaining portion may be discharged to the exhaust manifold later. In an alternate example, when the pressurized charge has a higher EGR content, a portion of the pressurized charge may be discharged to the exhaust manifold first and then a remaining portion may be discharged to the intake manifold later. By discharging to each of the intake and the exhaust during the same tip-in, it is possible to better balance the competing objectives of air/fuel mixing, fast spool up, and sufficient duration of increased output from the boost tank to fill substantially the entire turbo lag delay.

It will be appreciated that a tip-out following the tip-in may provide an opportunity for recharging the boost reservoir. For example, during the tip-out, the engine controller may selectively charge the boost reservoir with intake air from the intake manifold or combusted exhaust gas from the exhaust manifold, the selection based on a reservoir composition at the tip-out. The selection may be further based on an engine speed and a vehicle speed at the time of tip-out, as previously discussed at FIG. 2.

In this way, during a first tip-in, pressurized charge is discharged from a boost reservoir to an intake manifold while during a second tip-in, pressurized charge is discharged from the boost reservoir to an exhaust manifold. By discharging pressurized charge from the boost reservoir to the intake manifold during some conditions and to the exhaust manifold during other conditions, benefits from the use of a pressurized charge stored in a boost reservoir can be extended. Specifically, pressurized fresh intake air can be better used to reduce turbo lag while also meeting an interim torque demand. Likewise, pressurized exhaust gas can be better used to reduce turbo lag while also meeting EGR demands. Overall, boosted engine performance can be improved.

Now turning to FIG. 4, an example routine 400 is shown for discharging pressurized charge from a boost reservoir to an intake manifold while controlling an intake throttle. By delivering a portion of the pressurized charge to the intake manifold with the intake throttle closed, a boost pressure, or throttle inlet pressure, may be rapidly raised, allowing the compressor boost to be "pre-charged" before delivery into the intake manifold. In the mean time, torque demand may be met by discharging pressurized charge from the boost reservoir downstream of the throttle. In one example, the routine of FIG. 4 may be performed as part of the routine of FIG. 3, such as at step 312.

At 402, routine 400 includes confirming that the pressurized charge from the boost reservoir is to be discharged to the intake manifold. If not, the routine may end. In one example, pressurized charge may be discharged to the intake in response to a tip-in during boosted engine operation. Herein, during the tip-in, a throttle inlet pressure (TIP), estimated upstream of an intake throttle, may be below a threshold. As such, the boost reservoir may have been charged during an engine cycle preceding the tip-in with one or more of compressed air from the intake manifold or combusted exhaust gas from the exhaust manifold to store pressurized charge having a defined EGR percentage and a defined charge pressure.

Upon confirmation, at 404, the routine includes opening the boost reservoir intake discharge valve while closing the air intake throttle. The controller may then discharge the pressurized charge from the boost reservoir into the intake manifold, downstream of the intake throttle, while holding the intake throttle closed. Discharging pressurized charge to the intake manifold may include opening the reservoir intake discharge valve while maintaining the reservoir intake charge valve closed.

At 406, the routine includes operating the compressor while monitoring a throttle inlet pressure, TIP, (also indicative of a boost pressure generated at the compressor while the throttle is held closed). In one example, TIP may be estimated by a pressure sensor position in the intake manifold downstream of the compressor and upstream of the air intake throttle. As such, while the turbine gradually spools up, the compressor pressure also gradually increases. Accordingly, TIP also increases. Herein, by holding the throttle closed, the increase in boost pressure, or TIP, may be expedited. As a result, by the time the throttle is opened, a sufficient amount of pressurized boost air may be generated by the compressor and stored, or pre-charged, upstream of the throttle. This boost pressure can then be delivered to the intake manifold as soon as the throttle is opened.

Thus, the discharging of pressurized charge to the intake manifold while holding the intake throttle closed may be continued for a duration until the throttle inlet pressure is at or above a threshold. Alternatively, the discharging with the throttle held closed may be continued for a duration until a manifold pressure (MAP) downstream of the throttle matches the throttle inlet pressure upstream of the throttle.

At 408, it may be determined if the estimated TIP is higher than the threshold. In one example, the threshold may be based on a desired boost level or boost pressure. If TIP has reached the desired boost level before the boost reservoir has been completely discharged (or at the same time as the boost reservoir is fully discharged), then at 412, after the duration has elapsed, the routine includes closing the intake discharge valve while opening the throttle from the closed position. Due to opening of the intake throttle, pressurized aircharge that was stored and pre-charged upstream of the throttle may be discharged from downstream of the compressor into the intake manifold. That is, compressed air may be directed from the compressor into the intake manifold with the throttle open. As such, directing compressed air into the intake manifold with the throttle open includes discontinuing the discharging of pressurized charge to the intake manifold. Therein, each of the reservoir intake charge valve and discharge valve may be maintained closed.

As such, the boost reservoir may be discharged even before TIP reaches the threshold. Thus, if TIP is not above the threshold, then at 410, it may be determined if the boost reservoir has been completely discharged. If yes, then also the routine proceeds to 412 to close the intake discharge valve and open the throttle to allow aircharge pressurized at the compressor to be discharged into the intake manifold.

The controller may be further configured to adjust a spark timing while discharging the pressurized charge to the intake manifold and while directing compressed air to the intake manifold. For example, spark timing may be adjusted to a first timing during the discharging while holding the intake throttle closed while spark timing is adjusted to a second, different timing while directing compressed air with the throttle open. Herein, the first timing may be based on an amount and the EGR percentage of the discharged pressurized charge. Likewise, the second timing may be based on an amount and pressure of compressed air directed to the intake manifold. The second timing may also be based on the EGR percentage of the directed compressed air if any EGR (e.g., high pressure EGR or low pressure EGR via respective EGR passages) is performed while directing compressed air from the compressor to the intake manifold.

In this way, during a tip-in, while operating a compressor, cylinder pressure may be raised by discharging pressurized charge from a boost reservoir to an intake manifold while holding an intake throttle closed. The cylinder pressure may then be further raised during the tip-in by directing compressed air from the compressor to the intake manifold while opening the closed throttle. By delivering pressurized charge from a boost reservoir with the intake throttle closed, the discharged charge may be used to expedite turbine spool-up and reduce turbo lag while also meeting the engine torque demand during the turbo lag. By holding the intake throttle closed for a duration while the turbine spools up, a pressure of air compressed by the compressor may be rapidly raised. In addition, higher boost pressures may be attained. By then delivering the pressurized boost charge to the intake manifold after the throttle has been opened, boost benefits can be achieved. Overall, turbo lag is reduced while boost performance is enhanced. An example engine operation with discharging of pressurized charge from a boost reservoir to the intake manifold with the throttle closed for a duration is elaborated herein with reference to FIG. 8.

Now turning to FIG. 5, an example routine 500 is described for charging a boost reservoir with combusted exhaust gases and pressurized fresh air to generate a pressurized EGR mixture which can then be discharged to the intake manifold during boosted conditions to enable high pressure EGR benefits to be achieved.

At 502, engine operating conditions may be estimated and/or inferred. At 504, it may be confirmed that the engine is operating with boost but with a boost level that is lower than a threshold level. In one example, it may be confirmed that the boost level is above a lower threshold but below an upper threshold. If not, the routine may end. Upon confirmation, at 506, the routine includes, during low boost conditions, charging the boost reservoir with at least some combusted exhaust gas to a first, lower pressure. For example, the boost reservoir may be charged with only combusted exhaust gases from the exhaust manifold by opening the boost reservoir exhaust charge valve (for a duration). Alternatively, the reservoir may be charged with combusted exhaust gas from the exhaust manifold and fresh intake air from the intake manifold. As used herein, charging with combusted exhaust gas includes charging with one or more of low pressure EGR, high pressure EGR, and combusted exhaust gas received directly from the exhaust manifold via a valve. Charging the reservoir with combusted exhaust gas includes selectively opening a first valve coupled between the boost reservoir and the exhaust manifold. Following charging, the pressurized charge in the boost reservoir may have a defined EGR percentage (that is, the reservoir may be charged with a ratio of intake air to combusted exhaust has to provide the desired boost reservoir EGR percentage) and may be at a first, lower pressure.

At 508, after the charging of the boost reservoir has been completed, it may be determined if increased boost is required. In one example, increased boost may be demanded in response to a further tip-in while the engine is already boosted. In response to the tip-in, at 510, boost may be increased. For example, a compressor speed may be increased. At 512, it may be confirmed that boost has been increased and the boost level is now higher than the threshold. Upon confirmation, at 514, during higher boost conditions, the boost reservoir may be further charged with compressed intake gas to raise a pressure of the charge stored in the reservoir to a second, higher pressure. The further charging with compressed intake gas includes selectively opening a second valve coupled between the boost reservoir and the intake manifold, wherein the second valve is coupled between the boost reservoir and the intake manifold downstream of the intake throttle. By mixing the combusted exhaust gases stored in the reservoir at lower pressure with the compressed intake air at higher pressure, a high pressure EGR mixture may be generated in situ and stored in the boost reservoir, for subsequent discharging when high pressure EGR is required. In another example, the valve may be coupled upstream of the throttle.

At 516, it may be determined if a transient increase in EGR is requested. In one example, the transient increase in EGR may be requested at a later time during engine operation when the boost level is lower than the threshold (e.g., lower than the second pressure) and the operator tips-in. For example, while the engine is boosted, a tip-in towards wide open throttle may be received. As a result, a transient increase in EGR may be required. In response to the transient increase in requested EGR, at 518, the routine includes discharging pressurized charge from the boost reservoir to an engine manifold (e.g., discharging to an intake or exhaust manifold). For example, discharging to the intake manifold includes discharging downstream of a turbocharger compressor and downstream of an intake throttle. In this way, by discharging the pre-stored high pressure EGR from the boost reservoir to the intake manifold in response to a transient request for increased EGR, high pressure EGR can be availed. Specifically, the controller may selectively open a third valve coupled between the boost reservoir and the intake manifold, downstream of the intake throttle (that is, the boost reservoir intake discharge valve) and discharge the pressurized charge from the boost reservoir to the intake manifold downstream of the intake throttle. In one embodiment, while discharging the high pressure EGR from the boost reservoir, the intake throttle may be temporarily held closed. In one example, the discharging may be continued until the boost pressure equilibrates with the boost reservoir pressure after which the discharging may be discontinued. For example, the discharging may be continued until the boost pressure is at the second pressure.

The inventors herein have recognized that during boosted conditions, when transient EGR is required, the requested EGR may not always be available as rapidly as required. Specifically, recirculated exhaust gas may not be immediately available via low pressure EGR due to the slower response time of the low pressure EGR. At the same time, recirculated exhaust gas may also not be immediately available via a conventional high pressure EGR passage due to the pressure difference between the intake and exhaust manifolds which would cause the high pressure EGR to flow backwards into the exhaust manifold. To overcome these issues and still enable high pressure EGR benefits to be achieved, a pressure of the exhaust gas in the reservoir may be raised by mixing with an amount of compressed intake air before discharging. This allows high pressure EGR to be provided in response to a tip-in even when boost levels are already high. An example engine operation with charging of a boost reservoir with high pressure EGR and delivery of the high pressure EGR to the intake manifold during a transient EGR request is elaborated herein with reference to FIG. 7.

Figure 6:
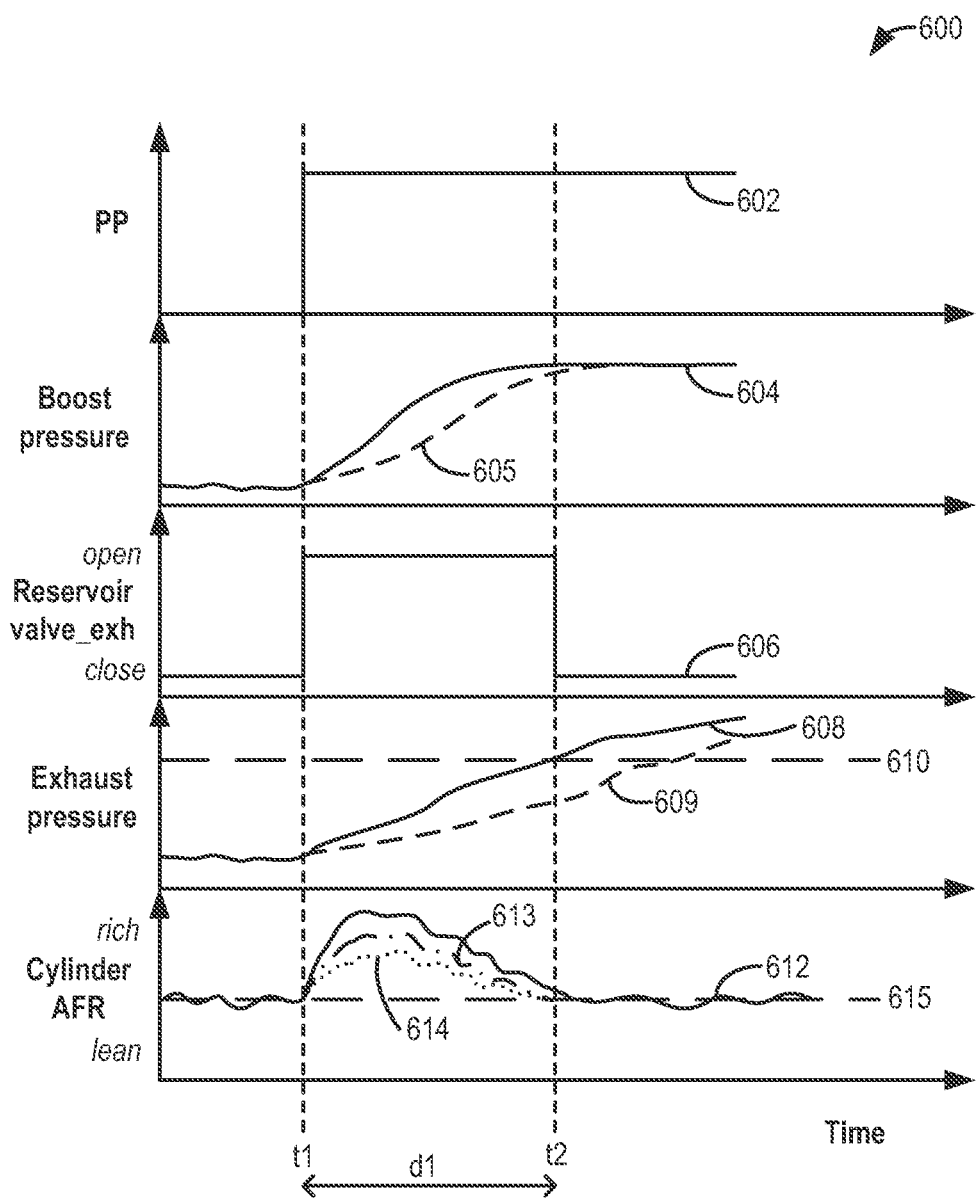
FIGS. 6-8 show example charging and discharging operations of a boost reservoir, according to the present disclosure.

Now turning to FIG. 6, map 600 shows an example engine operation wherein turbo lag is reduced by discharging pressurized charge to an exhaust manifold in response to a tip-in. Specifically, map 600 depicts a change in pedal position (PP) at plot 602, a change in boost pressure at plot 604, an opening or closing state of a boost reservoir exhaust discharge valve (reservoir valve_exh) at plot 606, a change in exhaust pressure at plot 608, and a change in cylinder air-to-fuel ratio (cylinder AFR) relative to stoichiometry at plot 612. In one example, the boost pressure may be estimated by a pressure sensor positioned in the intake manifold downstream of a turbocharger compressor, the exhaust pressure may be estimated by a pressure sensor in the exhaust manifold upstream of the turbine, and the cylinder air-to-fuel ratio may be estimated by an air-to-fuel ratio sensor coupled to an exhaust catalyst in the exhaust manifold.

Before t1, the engine may be operating with low boost pressure. For example, the engine may be operating un-boosted or at a low boost level. At t1, a tip-in event is confirmed, as indicated by the change in pedal position (plot 602). In response to the tip-in, a controller may be configured to discharge charge including air and combusted exhaust gas from a boost reservoir into the exhaust manifold, upstream of a turbine, to reduce turbo lag. Specifically, a boost reservoir exhaust discharge valve may be opened for a duration between t1 and t2 (plot 606).

As elaborated in FIG. 1, the boost reservoir may be coupled to the exhaust manifold via each of a first exhaust charge valve and a second exhaust discharge valve. Accordingly, discharging charge from the reservoir into the exhaust manifold includes opening the second (exhaust discharge) valve while maintaining the first (exhaust charge) valve closed. As such, the boost reservoir may have been charged with compressed air from the intake manifold and/or combusted exhaust gas from the exhaust manifold during a charging opportunity prior to the tip-in. Therein, when charging the reservoir with combusted exhaust gas from the exhaust manifold, the second valve may have been opened while the first valve was maintained closed. As such, when charging the reservoir with compressed intake air from the intake manifold, a reservoir intake charge valve may be have been opened while maintaining an intake discharge valve closed.

In response to the discharging of pressurized charge from the boost reservoir into the exhaust manifold at t1, an exhaust pressure (plot 608) may start to increase. Herein, by dissipating pressurized charge from the reservoir into the exhaust manifold responsive to the tip-in, an exhaust pressure upstream of the turbine may be raised faster than would otherwise be possible. The rapid increase in exhaust pressure enables faster turbine spool-up. This, in turn, allows turbo lag to be reduced and allows a boost pressure at the compressor to be rapidly raise (plot 604). In comparison, plot 609 (dashed line) shows a slower increase in exhaust pressure that may be expected in the absence of pressurized charge being dissipated from a boost reservoir into the exhaust manifold. Due to the slower increase in exhaust pressure, turbine spool-up may be delayed leading to turbo lag, which is reflected in the slower rise in boost pressure (at the compressor), as shown at plot 605 (dashed line). It will be appreciated that in both cases, the exhaust pressure is raised to the same level (see plots 608 and 609) and the boost pressure is also raised to the same level (see plots 604 and 605), albeit at different rates. However, by dissipating pressurized charge to the exhaust manifold, turbine spinning is expedited, turbo lag is reduced, and boost pressures are rapidly attained. This allows boosted engine performance to be improved.

During the discharging to the exhaust manifold, the engine controller may adjust a fuel injection to the engine cylinder to be richer (as shown by enrichment of cylinder AFR at plot 612) and/or later (not shown). Herein, a richness and delay in the fuel injection may be based on the (discharged) pressurized charge so as to maintain an exhaust air-to-fuel ratio at an exhaust catalyst substantially at or around stoichiometry 615. Specifically, the richness of and delay in the cylinder fuel injection may be adjusted to match the fresh compressed air component of the charge dissipated from the boost tank into the exhaust manifold so that an overall mixture sensed at the exhaust (e.g., downstream of the turbine and downstream of an exhaust catalyst in the exhaust manifold) is maintained substantially at or around stoichiometry. In addition, the reaction of the extra oxygen in the air component of the boost reservoir charge with the rich fuel injection generates additional exhaust heat which further assists in expediting turbine spool-up and reducing turbo lag. For example, the cylinder fuel injection may be adjusted based on AFR feedback from one or more air-to-fuel ratio sensors (or oxygen sensors) located downstream of the turbine and the exhaust catalyst in the exhaust manifold. In still other examples, the fuel injection may be adjusted based on AFR feedback from an oxygen sensor positioned in the exhaust manifold, upstream of the turbine.

As elaborated above, the degree of richness of the fuel injection (that is, the cylinder AFR shown on plot 612) may vary based on the amount of pressurized charge released from the reservoir (or rate of discharge) and the EGR percentage of the discharged pressurized charge. Thus, as the EGR percentage of the boost reservoir charge decreases (that is, there is a higher ratio of fresh intake air in the charge to combusted exhaust gas), a more rich cylinder fuel injection may be required (as shown by plot 612, solid line). In comparison, as the EGR percentage of the boost reservoir charge becomes progressively higher (that is, there is a progressively ratio of fresh intake air to combusted exhaust gas in the charge), a richness of the fuel injection may be progressively decreased (as shown by plot 613 (dashed line) and plot 614 (dotted line)).

Between t1 and t2, as the pressurized charge from the boost reservoir is discharged into the exhaust manifold, and as the exhaust pressure upstream of the turbine increases, a rate of discharge from the reservoir into the exhaust manifold decreases. That is, when the exhaust discharge valve is first opened at t1, pressurized charge may be discharged into the exhaust manifold at a faster rate. Thus, during this faster rate of discharging, when a larger amount of charge is released into the exhaust manifold, the richness of the rich fuel injection may be relatively higher. Then, as time point t2 approaches, the exhaust pressure (plot 608) starts approaching threshold pressure 610, and pressurized charge may be discharged into the exhaust manifold at a slower rate. Thus, during this slower rate of discharging, when a smaller amount of charge is released into the exhaust manifold, the richness of the rich fuel injection may be relatively lower. Specifically, a gradual tapering down of the richness (and/or delay) of the fuel injection occurs, as shown by the cylinder AFR richness gradual tapering down towards stoichiometry 615.

As such, the discharging from the reservoir into the exhaust manifold is continued for a duration d1 (between t1 and t2) until an exhaust pressure upstream of the turbine is at threshold pressure 610. At t2, when the exhaust pressure upstream of the turbine is at threshold pressure 610, the reservoir exhaust discharge valve may be closed (plot 606). The threshold pressure 610 may be based on the boost reservoir pressure (not shown). As such, as the reservoir is discharged, the exhaust pressure increases and the boost reservoir pressure decreases. When the exhaust pressure is the same as the boost reservoir pressure, no further flow may be possible, and no further benefits from the boost reservoir charge can be attained. Thus, the threshold pressure 610 may set based on an expected rate of drop of the boost reservoir pressure and may incorporate a difference so that the exhaust discharge valve is closed before the exhaust pressure has reached the boost reservoir pressure. That is, to enable maximal boost reservoir charge benefits to be incurred, the exhaust discharge valve may be closed before the reservoir is emptied and while the boost reservoir pressure is still above the exhaust pressure.

By the time the reservoir exhaust discharge valve is closed at t2, the exhaust pressure may be sufficiently high (e.g., higher than threshold 610) and turbine spool-up may have been enabled. As a result, the compressor boost pressure may also be sufficiently high. That is, turbo lag may be reduced. As a result, after t2, the engine torque demand may be met by the turbocharger compressor.

Figure 7:
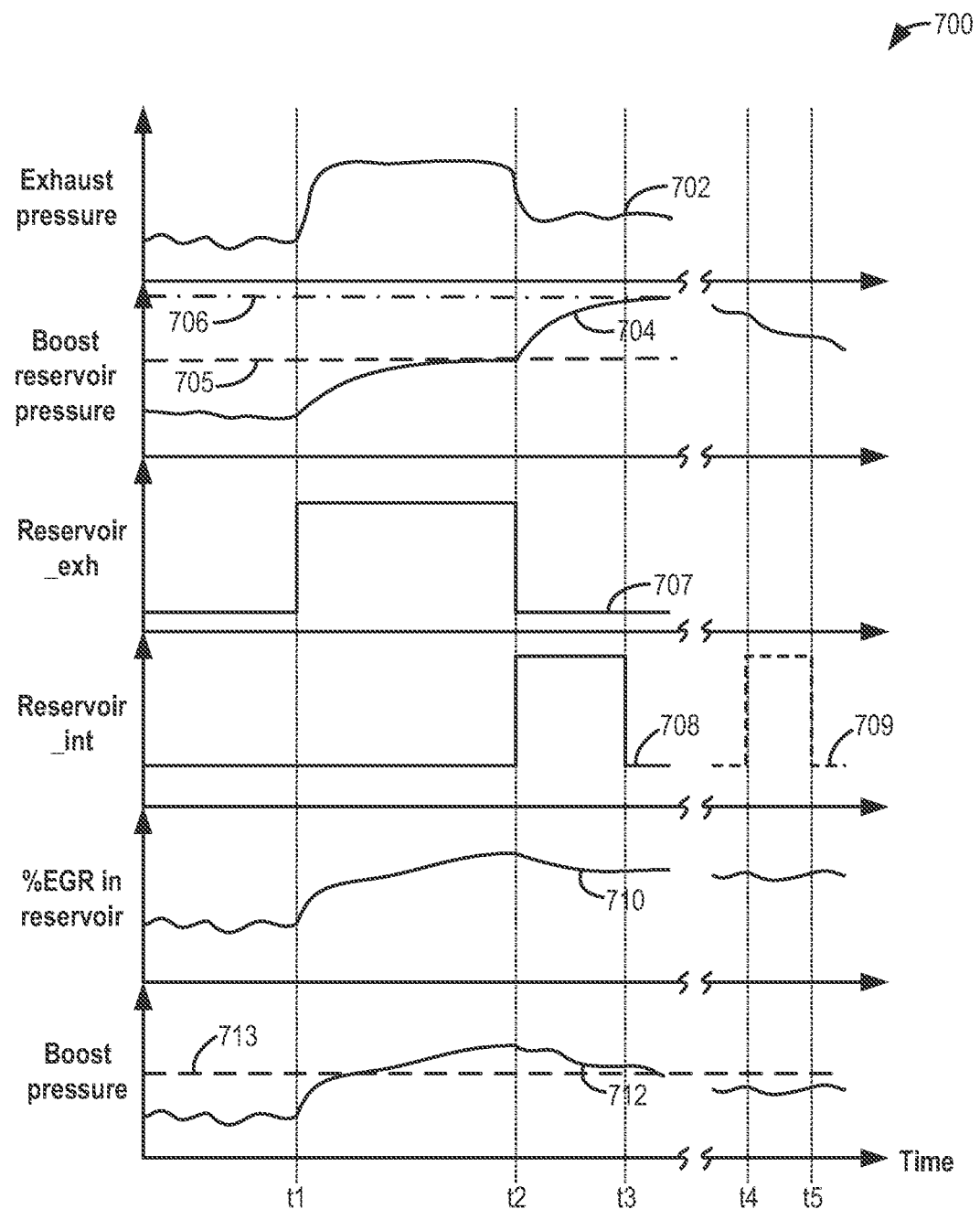

Now turning to FIG. 7, map 700 shows an example engine operation wherein a boost reservoir is charged with high pressure EGR and then the high pressure EGR is delivered to the intake manifold during a transient request for increased EGR. Specifically, map 700 depicts a change in exhaust pressure at plot 702, a change in boost reservoir pressure at plot 704, an opening or closing state of a boost reservoir exhaust charge valve (reservoir_exh) at plot 707, an opening or closing state of a boost reservoir intake charge and discharge valve (reservoir_int) at plots 708-709, a change in EGR percentage in the boost reservoir at plot 710, and a change in boost pressure at plot 712. In one example, the boost pressure may be estimated by a pressure sensor positioned in the intake manifold downstream of a turbocharger compressor, the exhaust pressure may be estimated by a pressure sensor in the exhaust manifold upstream of the turbine, and the boost reservoir pressure may be estimated by a pressure sensor coupled to the boost reservoir. The EGR percentage in the boost reservoir may be estimated by appropriate sensors or inferred based on engine operating conditions at a time of reservoir charging and discharging.

Before t1, the engine may be operating with low boost pressure. For example, the engine may be operating un-boosted or at a low boost level. At t1, the boost level may be increased (plot 712), for example, in response to a tip-in, but may remain below a threshold level 713. Following t1, during a first engine cycle where the engine is boosted, but while the boost level is lower than threshold 713, the boost reservoir may be charged to a first pressure 705 with at least some combusted exhaust gas from the exhaust manifold (plot 704). Specifically, a boost reservoir exhaust charge valve may be opened for a duration between t1 and t2 (plot 707). As a result of charging the boost reservoir with combusted exhaust gas from the exhaust manifold, an EGR percentage of the reservoir charge may increase (plot 710).

At t2, during a second, later engine cycle, when the boost level is higher than threshold 713 (plot 712), the boost reservoir may be further charged to a second higher pressure 706 with compressed intake air. Specifically, a boost reservoir intake charge valve may be opened for a duration between t2 and t3 (plot 708). Since boost pressure is used to further charge the reservoir, the boost pressure downstream of the compressor may decrease (plot 712). As a result of charging the boost reservoir with compressed intake air from the intake manifold, an EGR percentage of the reservoir charge may slightly decrease (plot 710). However, the slight decrease in EGR percentage is considered acceptable in view of the substantial gain in pressure. Thus, at t2, a high pressure exhaust gas and compressed air mixture may be generated and stored in the boost reservoir. As such, this may provide a source of high pressure EGR that can be advantageously used to meet transient EGR demands received while the engine is under boosted operation.

In this way, a controller may operate a turbocharger to provide an engine boost. Then, when the engine boost is lower than a threshold, the controller may charge the reservoir to a first pressure with at least some combusted exhaust gas from the exhaust manifold. Further, when the engine boost is higher than the threshold, the controller may charge the reservoir to a second, higher pressure with at least some compressed intake air from the intake manifold. As a result, a high pressure EGR mixture is stored in the boost reservoir. Specifically, even though the exhaust pressure is otherwise not high enough to charge the reservoir to a sufficient pressure for subsequent delivery to the engine intake during boosted engine operation, the addition of higher pressure intake gasses can raise the pressure, thus allowing at least some exhaust gas to be delivered to the intake, even when the engine is highly boosted.

At a later time (t4), such as during a third engine cycle following the second engine cycle, a transient request for increased EGR may be received. In response to this request, the pressurized charge at the second higher pressure 706 may be discharged from the boost reservoir to the intake manifold. Specifically, a boost reservoir intake discharge valve may be opened for a duration between t4 and t5 (plot 709, dashed line). The discharging during the third engine cycle may be performed in response to a tip-in event received during boosted engine operation, or in response to an EGR request received during boosted engine operation, for example. As such, during the third engine cycle, the boost level is lower than the second pressure of the boost reservoir. That is, the boost pressure may not be higher than a pressure of the charge (herein, the high pressure EGR) pre-stored in the boost reservoir. By discharging high pressure EGR to the engine intake, high pressure EGR may be rapidly provided via a boost reservoir to improve combustion control and reduce NOx emissions. Specifically, EGR may be provided during boosted engine conditions when neither conventional high pressure EGR nor conventional low pressure EGR can be rapidly and reliable delivered to the engine.

It will be appreciated that while the above example depicts pre-storing high pressure EGR and then providing the high pressure EGR in response to a transient request for increased EGR, the engine controller may be configured to additionally provide low pressure EGR. Therein, exhaust gas may be recirculated via an EGR passage including an EGR valve, the EGR passage coupled between the intake manifold and the exhaust manifold of the engine. Specifically, during a given engine cycle, the controller may open the EGR valve of the EGR passage to recirculate exhaust gas from the exhaust manifold to the intake manifold (in comparison to recirculating higher pressure EGR via the boost reservoir over a plurality of engine cycles).

In this way, exhaust gas may be recirculated from an exhaust manifold, upstream of a turbine, to an intake manifold, downstream of a compressor, via a boost reservoir. Exhaust gas may be further recirculated from the exhaust manifold, downstream of the turbine, to the intake manifold, upstream of the compressor, via an EGR passage (that is, a low pressure EGR passage). Specifically, the exhaust gas recirculated via the boost reservoir may be at a higher pressure (that is, high pressure EGR) than the exhaust gas recirculated via the EGR passage (that is, low pressure EGR). In this way, low pressure EGR benefits and high pressure EGR benefits may both be achieved. By pre-storing combusted exhaust in a boost reservoir, the pressurized charge can be discharged at a later time, when needed, to supplement conventional high pressure or low pressure EGR.

Figure 8:
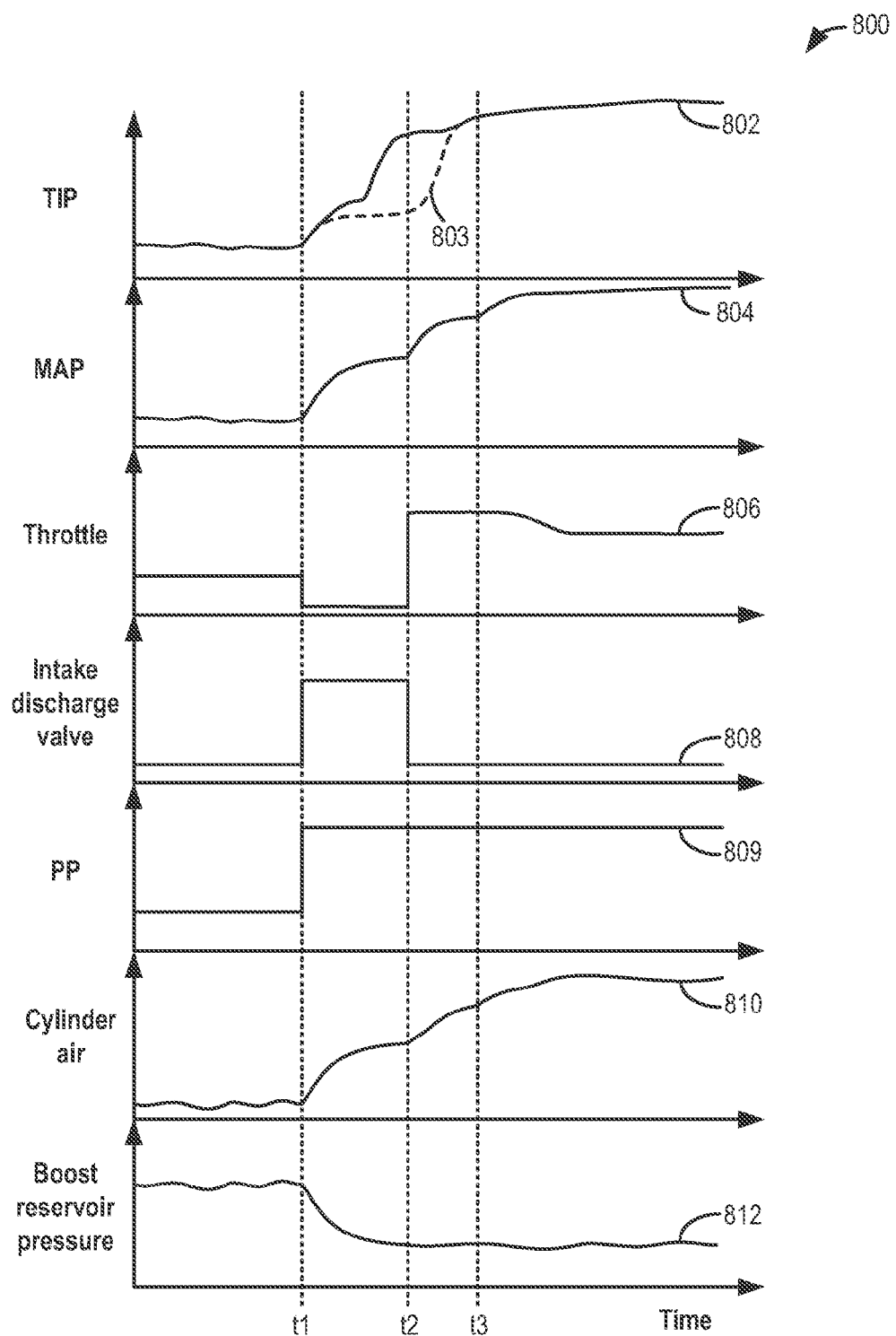

Now turning to FIG. 8, map 800 shows an example engine operation wherein cylinder pressure is raised by discharging pressurized charge from a boost reservoir with the throttle closed while a compressor is run to raise boost pressure. Then, the throttle is opened and compressed air is directed into the intake manifold. Specifically, map 800 depicts a change in throttle inlet pressure (TIP) at plot 802, a change in manifold air pressure (MAP) at plot 804, a change in throttle position at plot 806, an opening or closing state of a boost reservoir intake discharge valve at plot 808, a change in pedal position at plot 809, a change in cylinder pressure at plot 810, and a change in boost reservoir pressure at plot 812. In one example, the throttle inlet pressure may be estimated by a pressure sensor positioned in the intake manifold downstream of a turbocharger compressor and upstream of the air intake throttle, the manifold pressure may be estimated by a pressure sensor in the intake manifold downstream of the throttle, and the boost reservoir pressure may be estimated by a pressure sensor coupled to the boost reservoir.

Before t1, the engine may be operating with low TIP. For example, the engine may be operating un-boosted or at a low boost level. At t1, in response to a tip-in (as indicated by the change in pedal position at plot 809) a turbocharger compressor may be operated. As a result of operating the compressor, a boost pressure may start to slowly increase, as mirrored by the slow increase in TIP (plot 802). As such, for the compressor pressure to be sufficiently high, rapid turbine spool-up is needed. Until then, a turbo lag may be incurred. To enable higher boost pressures to be achieved more rapidly, at t1, during the tip-in, pressurized charge (including one or more of compressed air and combusted exhaust gas) is discharged from the boost reservoir to the intake manifold, downstream of an intake throttle. The discharging is performed for a duration (between t1 and t2) with the throttle held closed (plot 806). To discharge the pressurized charge from the reservoir, the intake discharge valve coupling the reservoir to the intake manifold is opened for the duration between t1 and t2 (plot 808).

As the boost reservoir is discharged (see drop in boost reservoir pressure at plot 812), a manifold pressure estimated downstream of the throttle increases (plot 804). Further, a cylinder air charge increases (plot 810). This pressurized air allows an engine torque demand to be met while the turbine spools up and while the compressor spins up to provide the desired boost pressure. In addition, by holding the throttle closed while the compressor is operating, boost pressure may be pre-charged. Specifically, a boost pressure (and thus TIP) may be raised to a threshold value faster than would be otherwise possible. As can be seen at plot 802, between t1 and t2, the compressor pressure (mirrored by TIP while the throttle is closed) increases at a first, slower rate as the turbine slowly spools up to spin the compressor, and then increases at a second, faster rate as the turbine spins up faster and as boost pressure accumulates upstream of the closed throttle. As such, this operation with the throttle closed allows turbo lag to be reduced, as shown by a slower rate of attained the threshold TIP in the absence of discharging from a reservoir with the throttle closed (plot 803, dashed line).

At t2, the pressure upstream of the throttle (TIP) may be at or above a threshold. Therefore, after the duration, at t2, discharging from the reservoir may be discontinued (plot 808) and compressed air may be directed from the compressor to the intake manifold with the intake throttle open (plot 806). Specifically, the intake throttle may be opened from the previous closed position and the compressor boost (that was being pre-charged upstream of the closed throttle) may be directed into the intake manifold. As a result, MAP may rapidly increase and cylinder air charge can also rapidly increase. In this way, turbo lag is reduced while boost pressures are rapidly attained by temporarily discharging pressurized air from a boost reservoir to an intake manifold with the throttle closed.

In this way, a boost reservoir may be advantageously used to store pressurized charge including compressed air and/or combusted exhaust gas for subsequent delivery. Based on engine conditions, the boost reservoir may be charged to achieve a desired charge pressure and EGR percentage. By pre-storing an amount of intake air and/or combusted exhaust gas in a reservoir and discharging into the engine intake or exhaust manifold based on operating conditions, turbo lag may be reduced even if boost is already present. By providing the charge to the intake manifold during some conditions, turbo lag can be reduced while meeting interim engine torque demands. By providing the charge to the exhaust manifold during other conditions, charge usage can be spread over a longer duration as the turbine consumes the charge at a lower rate than the engine induction. As a result, the increased exhaust pressure can assist in compensating for turbo-lag, and maintain a continuously increasing engine output while responding to a tip-in. By mixing combusted exhaust gas with compressed intake air in the reservoir, high pressure EGR may be generated and stored in the reservoir for delivery to the intake manifold, even during highly boosted engine operation. The discharged high pressure EGR can improve combustion control and reduced NOx emissions during boosted operation. By pre-charging a compressor boost air with the throttle closed, TIP may be raised faster than would be otherwise possible. By allowing boost air from the reservoir to be discharged into the intake while a pressure of the compressor boost air is raised, turbo lag may be better addressed while also meeting the torque demands. Overall, boosted engine performance is improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling a turbocharged engine with an electronic controller, comprising:
responsive to a first accelerator pedal tip-in determined by the controller, discharging pressurized charge from a boost reservoir to an intake manifold via an intake discharge valve; and
during a second accelerator pedal tip-in determined by the controller, discharging pressurized charge from the boost reservoir to an exhaust manifold via an exhaust discharge valve.

2. The method of claim 1, wherein the pressurized charge includes a mixture of combusted exhaust gas and compressed intake air, the pressurized charge having a charge pressure and a charge EGR percentage.

3. The method of claim 1, wherein discharging to the intake manifold includes discharging downstream of a compressor and downstream of an intake throttle, and wherein discharging to the exhaust manifold includes discharging upstream of a turbine.

4. The method of claim 1, wherein during the first accelerator pedal tip-in, the discharged charge has a lower EGR percentage, and wherein during the second accelerator pedal tip-in, the discharged charge has a higher EGR percentage.

5. The method of claim 1, further comprising,
during the first accelerator pedal tip-in, while discharging to the intake manifold, maintaining an intake throttle closed; and
during the second accelerator pedal tip-in, while discharging to the exhaust manifold, adjusting a fuel injection to an engine cylinder based on the discharged pressurized charge to maintain an exhaust air-to-fuel ratio substantially at stoichiometry.

6. The method of claim 1, wherein an engine boost level at the first accelerator pedal tip-in is lower than the engine boost level at the second accelerator pedal tip-in.

7. The method of claim 1, further comprising, during a accelerator pedal tip-out following the first or second accelerator pedal tip-in, selectively charging the boost reservoir with intake air from the intake manifold or combusted exhaust gas from the exhaust manifold, the selection based on a reservoir composition at the accelerator pedal tip-out.

8. The method of claim 1, wherein during the first accelerator pedal tip-in, the discharging is continued until an exhaust temperature is above a threshold temperature, and wherein during the second accelerator pedal tip-in, the discharging is continued until an exhaust pressure is above a threshold pressure.

9. A method for controlling an engine with an electronic controller, comprising, charging a boost reservoir coupled to the engine with one or more of fresh intake air from an intake manifold and combusted exhaust gas from an exhaust manifold via at least a valve; and responsive to an accelerator pedal tip-in determined by the controller, selectively discharging pressurized charge from the boost reservoir to the intake manifold or the exhaust manifold, the selection made via the controller based on an EGR percentage of the pressurized charge via at least the valve.

10. The method of claim 9, wherein the selection between discharging pressurized charge from the boost reservoir to the intake manifold or to the exhaust manifold is further based on a charge pressure of the pressurized charge.

11. The method of claim 10, wherein selecting based on the charge pressure of the pressurized charge includes selectively discharging to the intake manifold when the charge pressure is higher than a threshold, and selectively discharging to the exhaust manifold when the charge pressure is lower than the threshold.

12. The method of claim 11, wherein the selection is further based on a boost level at the accelerator pedal tip-in, the selection including selectively discharging to the intake manifold when the boost level is lower than a threshold level, and selectively discharging to the exhaust manifold when the boost level is higher than the threshold level.

13. The method of claim 12, wherein charging of the boost reservoir is performed during an engine cycle preceding the accelerator pedal tip-in.

14. The method of claim 9, wherein charging the boost reservoir includes selectively charging the boost reservoir only with intake air from the intake manifold, downstream of a compressor during a first condition, and selectively charging the boost reservoir only with combusted exhaust gas from the exhaust manifold, upstream of a turbine during a second condition.

15. The method of claim 9, wherein charging the boost reservoir includes charging the boost reservoir with a first amount of combusted exhaust gas at a first, lower pressure from the exhaust manifold, upstream of a turbine, and further charging the boost reservoir with a second amount of fresh intake air at a second, higher pressure from the intake manifold, downstream of the compressor, the first and second amounts adjusted to provide an EGR percentage of the pressurized charge.

16. The method of claim 9, wherein an EGR percentage of the pressurized charge is inferred based on one or more of an exhaust air-fuel sensor output, MAF, and injector pulse-width.

17. An engine system, comprising:

an engine including an intake manifold and an exhaust manifold;

a turbocharger including a compressor and a turbine;

a boost reservoir coupled to the intake manifold via each of an intake charge valve and an intake discharge valve, the boost reservoir further coupled to the exhaust manifold via each of an exhaust charge valve and an exhaust discharge valve; and a controller with computer readable instructions for, charging the boost reservoir with combusted exhaust gas and compressed intake air to store a pressurized charge having a charge pressure and a charge EGR percentage; and during an accelerator pedal tip-in as determined by the controller when pedal position exceeds a threshold, discharging the pressurized charge from the boost reservoir to each of the intake and the exhaust manifold for different levels of boost in the reservoir at the accelerator pedal tip-in.

18. The system of claim 17, wherein discharging based on the boost level includes, when the boost level at the accelerator pedal tip-in is higher than the charge pressure, discharging to the exhaust manifold; and when the boost level at the accelerator pedal tip-in is lower than the charge pressure, discharging to the intake manifold if EGR is requested and discharging to the exhaust manifold if EGR is not requested.

19. The system of claim 17, wherein charging the boost reservoir with combusted exhaust gas includes opening the exhaust charge valve to draw combusted exhaust gas from upstream of the turbine, wherein discharging the boost reservoir to the exhaust manifold includes opening the exhaust discharge valve to discharge pressurized charge upstream of the turbine, wherein charging the boost reservoir with compressed intake air includes opening the intake charge valve to draw intake air from upstream of a throttle, and wherein discharging the boost reservoir to the intake manifold includes opening the intake discharge valve to discharge pressurized charge downstream of the throttle.

20. The system of claim 17, wherein the controller includes further instructions for, adjusting a throttle position towards a more closed throttle position while discharging to the intake manifold; and adjusting a fuel injection amount and/or timing while discharging to the exhaust manifold.

\* \* \* \* \*